United States Patent
Ocegueda et al.

(10) Patent No.: US 12,244,743 B2
(45) Date of Patent: Mar. 4, 2025

(54) SYSTEMS AND METHODS FOR PERFORMING BLOCKCHAIN OPERATIONS USING MULTI-PARTY COMPUTATION COHORT MANAGEMENT GROUPINGS

(71) Applicant: Coinbase, Inc., Oakland, CA (US)

(72) Inventors: Luis Ocegueda, San Mateo, CA (US); Cassandra Alexandria Heart, Wichita, KS (US); Anika Raghuvanshi, San Francisco, CA (US); Adam C. Everspaugh, Evanston, IL (US); Jonathan Ariel Bergknoff, Richardson, TX (US); Michael Lodder, Lehi, UT (US); Paras Shah, Sunnyvale, CA (US); Xiang Li, Kirkland, WA (US)

(73) Assignee: Coinbase, Inc., Oakland, CA (US)

( * ) Notice: Subject to any disclaimer, the term of this patent is extended or adjusted under 35 U.S.C. 154(b) by 326 days.

(21) Appl. No.: 17/849,573

(22) Filed: Jun. 24, 2022

(65) Prior Publication Data
US 2023/0421397 A1     Dec. 28, 2023

(51) Int. Cl.
*H04L 9/00*    (2022.01)
*H04L 9/08*    (2006.01)
*H04L 9/14*    (2006.01)
*H04L 9/32*    (2006.01)

(52) U.S. Cl.
CPC .............. *H04L 9/50* (2022.05); *H04L 9/0825* (2013.01); *H04L 9/085* (2013.01); *H04L 9/14* (2013.01); *H04L 9/3247* (2013.01); *H04L 2209/46* (2013.01)

(58) Field of Classification Search
CPC ......... H04L 9/50; H04L 9/0825; H04L 9/085; H04L 9/14; H04L 9/3247
USPC .......................................................... 713/168
See application file for complete search history.

(56) References Cited

U.S. PATENT DOCUMENTS

| | | | |
|---|---|---|---|
| 7,626,944 B1 * | 12/2009 | Riddle | H04L 41/0806 370/254 |
| 9,948,467 B2 * | 4/2018 | King | H04L 63/0876 |
| 10,903,991 B1 * | 1/2021 | Craige | H04L 9/085 |
| 2020/0036530 A1 * | 1/2020 | Lampkins | H04L 9/085 |
| 2020/0044863 A1 * | 2/2020 | Yadlin | G06F 9/54 |
| 2020/0084049 A1 * | 3/2020 | Lindell | H04L 9/085 |
| 2020/0280855 A1 * | 9/2020 | Avetisov | H04L 63/20 |
| 2022/0045867 A1 * | 2/2022 | Beery | H04L 9/0891 |
| 2022/0318907 A1 * | 10/2022 | Bleznak | G06Q 20/065 |
| 2023/0344642 A1 * | 10/2023 | Heart | H04L 9/3255 |
| 2024/0048361 A1 * | 2/2024 | Berger | H04L 9/088 |
| 2024/0048532 A1 * | 2/2024 | Berger | H04L 63/061 |

\* cited by examiner

*Primary Examiner* — Dant B Shaifer Harriman
(74) *Attorney, Agent, or Firm* — Foley & Lardner LLP

(57) ABSTRACT

Methods and systems described herein relate to an improved platform that provides secure, encrypted communications across distributed computer networks when coordinating cryptography-based digital repositories in order to perform blockchain operations in decentralized applications. More specifically, the methods and systems provide this improved platform by introducing additional abstraction layers into a production service for computing signatures during multi-party computation (MPC) signing procedures.

20 Claims, 11 Drawing Sheets

SYSTEMS AND METHODS FOR PERFORMING BLOCKCHAIN OPERATIONS USING MULTI-PARTY COMPUTATION COHORT MANAGEMENT GROUPINGS

BACKGROUND

In recent years, the use of blockchains and blockchain technology has exponentially increased. Blockchains comprise a list of records, called "blocks," that are "chained" together using cryptography. Each block may comprise data that is computed using a one-way function (e.g., a function that is practically impossible to invert or reverse-compute) of a previous block, a time stamp (e.g., indicating a creation and/or modification time), and additional data (e.g., transactional or operational data related to blockchain operations).

While publicity for blockchains and blockchain technology has been concentrated on its use for cryptocurrencies and smart contracts, blockchains and blockchain technology may be applicable to numerous technological avenues. A common theme of the technological avenues is the manner in which blockchains and blockchain technology are decentralized such that facilitation, management, and/or verification of blockchain-based operations is governed or administered not by any one authority but instead by a community of users. The blockchain may therefore remain distributed (e.g., on a network of computers that communicate and coordinate their actions by passing messages to one another), and in many cases public, through a digital ledger, which records the series of blocks forming the chain. Notably, because each block depends on a preceding block, edits to existing blocks in the chain may not be made without affecting subsequent blocks.

Furthermore, updates to the blockchain (e.g., the addition of new blocks) may include incentivization systems that reward community members for the generation of the updates while also ensuring a consensus by the community. By doing so, the proliferation of the blockchain may proceed indefinitely.

SUMMARY

Methods and systems are described herein for novel uses and/or improvements to blockchains and blockchain technology. In particular, the methods and systems describe the use of, and improvements to, conventional digital key signing processes by using multi-party computation (MPC). For example, conventional key-share systems rely on a public-private key configuration where the security of the system is tied to the private key remaining private. MPC involves the use of multiple parties, each of which holds respective private data that may be used to evaluate a computation without ever revealing any of the private data held by each party. When using MPC in a digital key signing process, the use of MPC lessens the risk of unauthorized access as multiple keys would be needed by the unauthorized party. As such, MPC signing procedures have increasingly become the predominant security mechanism for platforms that provide secure, encrypted communications across distributed computer networks when coordinating cryptography-based digital repositories in order to perform blockchain operations in decentralized applications.

Conventional MPC signing procedures have two operational bedrocks, namely the use of a single, standardized signing protocol and the need for a secure broadcast channel. However, these two bedrocks of MPC signing procedures also present a challenge for platforms using MPC signing procedures. For example, while a single, standardized signing protocol provides efficiencies in developing a platform and also provides some security benefits as the platform may be designed and developed around the single, standardized signing protocol, this results in a need to re-engineer the platform if the platform needs to transition to a new signing protocol. Similarly, while conventional MPC signing procedures rely on a secure broadcast channel for operation, the reliability of maintaining a secure broadcast channel in all instances and for all users is continually decreasing as platforms increasingly serve non-traditional users (e.g., non-institutional users, geographically remote users, etc.) that interact with the platform from mobile devices and while on the go (e.g., on devices and/or in locations where maintaining secure broadcast channels is not feasible).

In view of these technical challenges to the conventional use of MPC signing procedures, the methods and systems described herein relate to a platform for computing signatures during MPC signing procedures. That is, the methods and systems described herein relate to an improved platform that provides secure, encrypted communications across distributed computer networks when coordinating cryptography-based digital repositories in order to perform blockchain operations in decentralized applications. More specifically, the methods and systems provide this improved platform by introducing additional abstraction layers into a production service for computing signatures during MPC signing procedures. Through the use of these abstraction layers, the production service for the platform overcomes the technical issues that have plagued MPC signing procedures (i.e., the amount of work needed to reconfigure the system when supporting a new protocol and ensuring that tasks can be completed if device(s) that manage the secure broadcast channel fail).

For example, through the use of abstraction layers in the production service, the platform may eliminate the need for the platform to enforce computational rounds. For example, the platform may use a digital signature algorithm (e.g., an Elliptic Curve Digital Signature Algorithm (ECDSA) or a threshold-based ECDSA (tECDSA)). The digital signature algorithm may require storing computations between rounds and determining which round to compute next. Conventional platforms that use an MPC signing procedure require the platform service to store computations between rounds and determine which round to compute next. As such, the enforcement of computational rounds is left to the platform. However, this enforcement requires the maintenance of the secure broadcast channel.

In contrast to this conventional approach, the methods and systems described herein use a platform comprising a production service for computing signatures during MPC signing procedures that features abstraction layers that abstract out certain operations conventionally performed by the platform (or a coordinator for the platform) when interacting with user devices in an MPC cohort. The coordinator for the platform may be an application programming interface (API), which accepts signature requests and facilitates their computation by user devices in an MPC cohort. The coordinator acts as an intermediary for communications between the user devices in the MPC cohort (e.g., as opposed to the user devices communicating with each other directly).

In one example, the platform pushes enforcement of computational rounds (and other signing policy enforcements) to user devices of an MPC cohort involved in individual tasks. In this case, the platform receives confirmation from the user devices in the MPC cohort that a signing policy (or portion thereof) has been completed and thus enforcement has been met. By doing so, the platform removes the need for a continuous secure broadcast channel to be maintained between the platform and the user devices in the MPC cohort during the entirety of the digital signing process. Instead, the platform and the user devices in the MPC cohort are only required to maintain secure broadcast channel sessions during initial key generation and distribution as well as during quorum processes for updating MPC cohorts, as opposed to continuously through the entirety of the digital signing process.

Additionally or alternatively, by relying on confirmation from the user devices in the MPC cohort that a signing policy (or portion thereof) has been completed and thus enforcement has been met, the platform also lessens the amount of system configuration that is needed to be performed when adding a new protocol to support. For example, by providing this abstraction layer, the platform may use switch statements for new protocol updates to the user devices in the MPC cohort, greatly reducing the technical burden as compared to reconfiguring the user devices in the MPC cohort to support the new protocol (e.g., adding new hash functions, signing curves, etc.). In another example of a technical benefit, by providing this abstraction layer, the platform increases its scalability to meet computational demand as the platform becomes stateless. This stateless nature allows for any number of coordinators to be brought online for the platform, while allowing processes for a task to be moved between the platform's coordinators without interrupting the completion of the task.

With respect to the configuration of the platform featuring this abstraction layer, the platform may comprise a common interface for the devices to perform specific cryptographic tasks (e.g., blockchain operations) while providing end-to-end encryption as tasks are performed. For example, the platform may comprise a coordinator that receives intermediate communications, during an MPC signing procedure, in an encrypted form. The coordinator may, without receiving messages of the intermediate communications in plain text or otherwise unencrypting the intermediate communications, transmit the received intermediate communications to other user devices in the MPC cohort to continue the MPC signing procedure. For example, instead of the coordinator enforcing signing policy rules, the coordinator simply directs the communications to the user devices in the MPC cohort. As the intermediate communications remain encrypted, the need for maintaining a secure broadcast channel is minimized. As such, only a result of a task (e.g., a signature that will be added to a blockchain) is required to be received by the platform in an unencrypted form and along a secure channel. For example, the user devices in an MPC cohort that are involved in the individual tasks may treat the coordinator as an untrusted party, which increases security for the task.

In some aspects, systems and methods for transmitting secure, encrypted communications across distributed computer networks using MPC for authorizing use of cryptography-based digital repositories in order to perform blockchain operations in decentralized applications are described. For example, the system may receive, at a remote coordination server from a first user device, a first user request to perform a blockchain operation for a first cohort for a first user account, wherein the first cohort includes a plurality of user devices authorized to contribute to a first tier of a digital signing ceremony featuring an MPC signing procedure for conducting blockchain operations corresponding to a cryptography-based storage application for the first user account, wherein the first tier of the digital signing ceremony is conducted between the plurality of user devices. The system may, in response to receiving the first user request, generate a query to one or more of the plurality of user devices. The system may, in response to the query, receive, at the remote coordination server from the first user device of the plurality of user devices, a first intermediary communication, wherein the first intermediary communication is one of a first plurality of intermediary communications that comprise the digital signing ceremony, and wherein t the remote coordination server does not have access to a respective message in each of the first plurality of intermediary communications. The system may, in response to receiving the first intermediary communication, transmit a second query to one or more of the plurality of user devices. The system may receive, at the remote coordination server, a result communication from a second user device of the plurality of user devices, wherein the result communication indicates a completion of the first tier of the digital signing ceremony, and wherein the result communication indicates that a signing policy for the first tier of the digital signing ceremony has been met.

The platform featuring this abstraction layer also provides downstream technical benefits with respect to enabling a novel two-tiered MPC signing procedure. For example, a technical issue with conventional MPC signing procedures is that it requires all human cosigners (e.g., user devices in an MPC cohort) to be online at one time. This results in a technical bottleneck for completing MPC signatures as the user devices are rarely online simultaneously. To address this problem, the platform implements a two-tiered MPC signing procedure.

For example, the technical benefit of the two-tiered MPC signing procedure is that it allows otherwise synchronous digital signature protocols to be performed asynchronously while still maintaining the security benefits of the MPC signing procedure. For example, during a first tier of the MPC signing procedure, the platform may allow up to a threshold number of user devices (e.g., human cosigners) to pre-approve a requested blockchain operation by submitting their respective digital signatures. When the MPC signing procedure (e.g., as enforced by the user devices in the MPC cohort) has received enough valid approvals (or the platform's coordinator receives a confirmation that the pre-approval component of the signing process has been completed), a second component of the two-of-two signing process may be performed to meet the digital signature requirement for a blockchain operation. For example, as the signing policy (and its enforcement) may be abstracted out of the platform, the platform may bifurcate the MPC signing procedure into asynchronous and synchronous tiers. As such, the signing policy for the MPC signing procedure may enforce different response times for communications in the two tiers. For example, the response time threshold for communications in the first tier may be higher (e.g., corresponding to slower responses due to some user devices being offline), while the response time threshold for communications in the second tier may be lower (e.g., corresponding to near-instantaneous response of an always-on coordinator).

In some aspects, systems and methods for performing a two-tiered MPC signing procedure for authorizing use of cryptography-based digital repositories in order to perform blockchain operations in decentralized applications are described herein. The system may receive, at a remote coordination server from a first user device, a first user request to perform a blockchain operation for a first cohort for a first user account, wherein the first cohort includes a plurality of user devices authorized to contribute to a first tier of a digital signing ceremony featuring an MPC signing procedure for conducting blockchain operations corresponding to the cryptography-based storage application for the first user account, wherein the first tier of the digital signing ceremony is conducted between the plurality of user devices. The system may coordinate the first tier of the digital signing ceremony in an asynchronous manner by: transmitting, at a first time, a first request for a first communication to the first user device of the plurality of user devices; receiving, at a second time, the first communication from the first user device; and determining whether a difference between the first time and the second time does not exceed a first time threshold. The system may, in response to determining that the difference between the first time and the second time does not exceed the first time threshold, coordinate a second tier of the digital signing ceremony in an synchronous manner by: transmitting, at a third time, a third request for a third communication to a second user device of the plurality of user devices; receiving, at a fourth time, the third communication from the second user device; and determining whether a difference between the third time and the fourth time does not exceed a second time threshold. The system may, in response to determining that the difference between the third time and the fourth time does not exceed the second time threshold, perform a blockchain operation.

Additionally or alternatively, the platform featuring this abstraction layer also provides downstream technical benefits with respect to maintaining a secure broadcast channel using MPC cohort management groupings within a novel network architecture. For example, as stated above, a technical challenge faced by MPC signing procedures is the maintenance of a secure broadcast channel as the platform increasingly serves non-traditional users (e.g., non-institutional users, geographically remote users, etc.) that interact with the platform from mobile devices and while on the go (e.g., on devices and/or in locations where maintaining secure broadcast channels is not feasible). While the use of the abstraction layer allows for some operations to be performed asynchronously (e.g., minimizing the need for a continuous, secure broadcast channel), the platform may still need to ensure that some operations are synchronous (and thus, e.g., require a secure broadcast channel). To overcome this technical challenge, the platform may use MPC cohort management groupings featuring a first group comprising user devices in the MPC cohort and a second group comprising an always-available, cloud-based server (e.g., a server sage). Additionally, the different groups may have different signing policies. For example, a first signing policy (e.g., for the first group) may require a threshold number of user devices to approve a blockchain operation, but the first signing policy may allow for the approvals to be received asynchronously (e.g., which may be beneficial in environments without reliable broadcast channels). A second signing policy (e.g., for a second group) may require a synchronous two-of-two signing protocol, but the second signing policy may dynamically determine what user device to include (e.g., along with an always-available server) for the two-of-two signing protocol (e.g., assuring that the user is available for the two-of two signing protocol).

Each group may include multiple devices, each with their own device keys, which are all equivalent for signature computation purposes. Only one representative from a given group is required to participate in a given digital signature computation, and the platform's signature computation requires one representative from each group (e.g., the server sage and any one of the user devices in the MPC cohort). As the server sage is always available, the need for the secure broadcast channel is met; thus, only a secure broadcast channel for the one of the user devices in the MPC cohort is required for the two-of-two signing process. By requiring only one user device to maintain the secure broadcast channel, the risk of a blockchain operation failure due to a lack of the MPC digital signing procedure being completed is greatly reduced.

In some aspects, systems and methods for performing blockchain operations across distributed computer networks using cohort management groupings for multi-party computations are described. The system may receive, at a remote coordination server, a first user request to perform a blockchain operation with a first user account. The system may, in response to receiving the first user request, determine, at the remote coordination server, a first cohort group for the first user account, wherein the first cohort group comprises a plurality of user devices authorized to contribute to a digital signing ceremony featuring an MPC signing procedure for conducting a plurality of blockchain operations corresponding to a cryptography-based storage application for the first user account, and wherein the first cohort group comprises a first signing policy. The system may transmit, at the remote coordination server, a first query to the plurality of user devices in the first cohort group. The system may receive, at the remote coordination server, a communication from one or more of the user devices in the plurality of user devices. The system may determine that the communication indicates that the first signing policy has been met. The system may determine a second cohort group for the first user account, wherein the second cohort group comprises a second signing policy. The system may perform the blockchain operation in response to receiving confirmation that the second signing policy has been met.

Various other aspects, features, and advantages of the invention will be apparent through the detailed description of the invention and the drawings attached hereto. It is also to be understood that both the foregoing general description and the following detailed description are examples and are not restrictive of the scope of the invention. As used in the specification and in the claims, the singular forms of "a," "an," and "the" include plural referents unless the context clearly dictates otherwise. In addition, as used in the specification and the claims, the term "or" means "and/or" unless the context clearly dictates otherwise. Additionally, as used in the specification, "a portion" refers to a part of, or the entirety of (i.e., the entire portion), a given item (e.g., data) unless the context clearly dictates otherwise.

DETAILED DESCRIPTION OF THE DRAWINGS

In the following description, for the purposes of explanation, numerous specific details are set forth in order to provide a thorough understanding of the embodiments of the invention. It will be appreciated, however, by those having skill in the art that the embodiments of the invention may be practiced without these specific details or with an equivalent arrangement. In other cases, well-known structures and devices are shown in block diagram form in order to avoid unnecessarily obscuring the embodiments of the invention.

Figure 1:
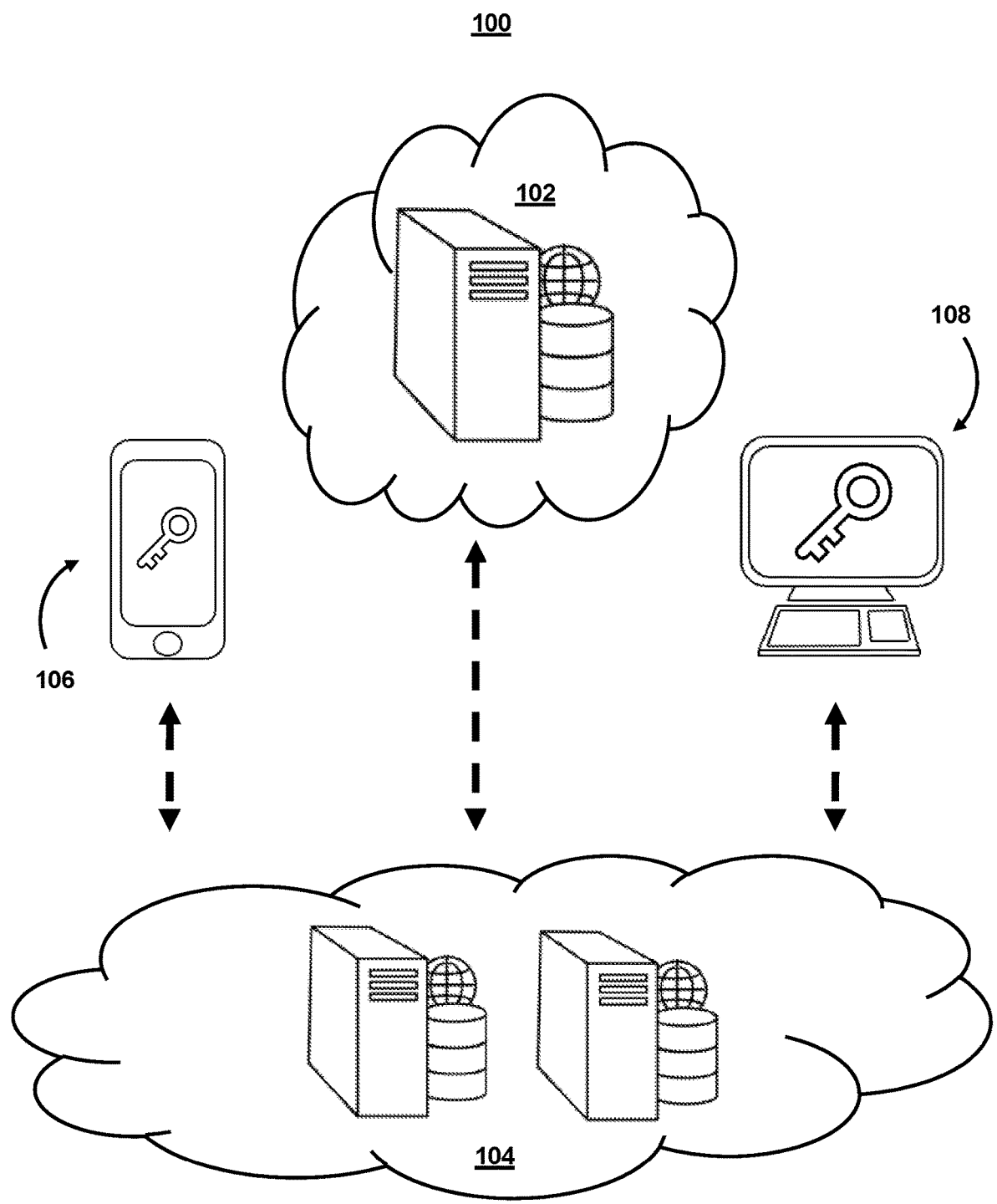
FIG. 1 shows an illustrative platform architecture for a production service for computing signatures during MPC signing procedures comprising an abstraction layer, in accordance with one or more embodiments.

FIG. 1 shows an illustrative platform architecture for a production service for computing signatures during MPC signing procedures comprising an abstraction layer. MPC involves the use of multiple parties, each of which holds respective private data that may be used to evaluate a computation without ever revealing any of the private data held by each party. For example, each party of the multiple parties may possess private data (e.g., $d_1, d_2, \ldots, d_N$). Together, the parties may use their respective private data to compute a value of a public function (e.g., $F(d_1, d_2, \ldots, d_N)$). While the private data is used to compute a value based on the function, the private data is kept private during that process.

The use of an MPC-based key lessens the risk involved with the loss of a private key and/or the private key being accessed by unauthorized parties. For example, conventional key-share systems rely on a public-private key configuration where the security of the system is tied to the private key remaining private. In some cases, these keys are stored in various cryptography-based digital repositories (or digital wallets). These digital wallets may have various configurations, typically categorized by whether the private key is held online or offline. For example, a hot storage wallet has a private key held online. A cold storage wallet has a private key held offline, and a hardware wallet has a private key held offline and on a physical device (e.g., a thumb drive). While holding a private key offline and/or tying the private key to a physical device is beneficial from a security perspective, this creates practical problems when attempting to conduct operations using the digital wallet. For example, to conduct an operation, a user must be able to access the private key from its offline location and/or the physical device. This is particularly burdensome for MPC-based key operations as it requires each user (e.g., corresponding to a respective private key) to be available at a given time.

Furthermore, the use of a private key stored at an offline location and/or the physical device increases the risk that the offline location becomes inaccessible and/or the physical device is lost. In such cases, the digital wallet and any digital assets therein may be lost as well. This creates a critical flaw in MPC-based key operations as the loss of any one key may result in the loss of digital assets for all of the parties. The methods and systems described herein overcome this problem through the use of threshold signing requirements, separate approval and signing policies, independent key recovery mechanisms, and cohort/group key creation. More specifically, the methods and systems described herein alleviate flaws in the MPC-based key operations by creating MPC-based key operations in which the MPC relies on partial private keys. In such cases, a partial private key is maintained online (e.g., in a hot wallet), whereas other partial private keys may remain offline. Furthermore, due to the use of the partial private keys, the exposure of the online partial private key does not in and of itself create a security risk (e.g., as multiple partial private keys, including an offline partial key, are required for conducting blockchain operations), and the loss of the offline partial private key (e.g., stored on a user device) does not create a risk of the loss of digital assets (e.g., as the online partial private key may be used to recover the offline private partial key). It should be noted that any embodiment related to the use of a partial private key may also be applied to a non-partial private key (as appropriate) and vice versa.

The MPC-based key operations maintain flexibility in the algorithm used. For example, the system may use online MPC algorithms such as the Gennaro and Goldfeder MPC algorithm and the Lindell et al. MPC algorithm. The online MPC algorithms have two limitations that restrict their use in conventional systems. First, they require users to wait for blockchain operations to undergo up to eight to twelve signature rounds, which can create latency issues. Second, they require the use of online storage for private keys. Due to the use of partial private keys (e.g., comprising an online and offline pair), the system may use online MPC algorithms. Furthermore, given that the online requirement for the online MPC algorithms is satisfied by the online partial private key, the system may use the online MPC algorithms while maintaining the offline partial private key (e.g., increasing overall security).

Additionally, the MPC-based key operations used by the system may include offline and/or online hybrid MPC algorithms. For example, the system may use MPC algorithms that include dynamic key refreshes (e.g., private key shares may be dynamically updated/modified at a given interval) and/or dynamic approval and/or signing policies. These dynamic policies are made possible by the online partial private key. Thus, the system introduces the enhanced security of dynamic systems, while still maintaining the security of offline systems (e.g., through the use of the offline partial private key).

Finally, the MPC-based key operations may use threshold key-signing policies in which only a threshold number of users (e.g., partial private keys corresponding to a user) are required. Upon determination by the system that the threshold is met, the system may allow a subsequent user (e.g., an online user) to finalize and perform a blockchain operation. As such, the system allows for the use of MPC-based key operations without requiring all parties to be online and/or available at the same time.

Conventional key-share systems rely on a public-private key configuration where the security of the system is tied to the private key remaining private. MPC involves the use of multiple parties, each of which holds respective private data that may be used to evaluate a computation without ever revealing any of the private data held by each party. When used in a digital key signing process, MPC lessens the risk of unauthorized access as multiple keys would be needed by the unauthorized party. As such, MPC signing procedures have increasingly become the predominant security mechanism for platforms that provide secure, encrypted communications across distributed computer networks when coordinating cryptography-based digital repositories in order to perform blockchain operations in decentralized applications.

Conventional MPC signing procedures have two operational bedrocks, namely the use of a single, standardized signing protocol and the need for a secure broadcast channel. However, these two bedrocks of MPC signing procedures also present a challenge for platforms using MPC signing procedures. For example, while a single, standardized signing protocol provides efficiencies in developing a platform and also provides some security benefits as the platform may be designed and developed around the single, standardized signing protocol, this results in a need to re-engineer the platform if the platform needs to transition to a new signing protocol. Similarly, while conventional MPC signing procedures rely on a secure broadcast channel for operation, the reliability of maintaining a secure broadcast channel in all instances and for all users is continually decreasing as platforms increasingly serve non-traditional users (e.g., non-institutional users, geographically remote users, etc.) that interact with the platform from mobile devices and while on the go (e.g., on devices and/or in locations where maintaining secure broadcast channels is not feasible).

In view of these technical challenges to the conventional use of MPC signing procedures, the methods and systems described herein relate to a platform for computing signatures during MPC signing procedures. That is, the methods and systems described herein relate to an improved platform that provides secure, encrypted communications across distributed computer networks when coordinating cryptography-based digital repositories in order to perform blockchain operations in decentralized applications. More specifically, the methods and systems provide this improved platform by introducing additional abstraction layers into a production service for computing signatures during MPC signing procedures. Through the use of these abstraction layers, the production service for the platform overcomes the technical issues that have plagued MPC signing procedures (i.e., the amount of work needed to reconfigure the system when supporting a new protocol and ensuring that tasks can be completed if device(s) that manage the secure broadcast channel fail).

For example, through the use of abstraction layers in the production service, the platform may eliminate the need for the platform to enforce computational rounds. For example, the platform may use a digital signature algorithm (e.g., an Elliptic Curve Digital Signature Algorithm (ECDSA) or a threshold-based ECDSA (tECDSA)). The digital signature algorithm may require storing computations between rounds and determining which round to compute next. Conventional platforms that use an MPC signing procedure require the platform service to store computations between rounds and determine which round to compute next. As such, the enforcement of computational rounds is left to the platform. However, this enforcement requires the maintenance of the secure broadcast channel.

In contrast to this conventional approach, the methods and systems described herein use a platform comprising a production service for computing signatures during MPC signing procedures that features abstraction layers that abstract out certain operations conventionally performed by the platform (or a coordinator for the platform) when interacting with user devices in an MPC cohort. The coordinator for the platform may be an API, which accepts signature requests and facilitates their computation by user devices in an MPC cohort. The coordinator acts as an intermediary for communications between the user devices in the MPC cohort (e.g., as opposed to the user devices communicating with each other directly).

In one example, the platform pushes enforcement of computational rounds (and other signing policy enforcements) to user devices of an MPC cohort involved in individual tasks. In this case, the platform receives confirmation from the user devices in the MPC cohort that a signing policy (or portion thereof) has been completed and thus enforcement has been met. By doing so, the platform removes the need for a continuous secure broadcast channel to be maintained between the platform and the user devices in the MPC cohort during the entirety of the digital signing process. Instead, the platform and the user devices in the MPC cohort are only required to maintain secure broadcast channel sessions during initial key generation and distribution as well as during quorum processes for updating MPC cohorts, as opposed to continuously through the entirety of the digital signing process.

Additionally or alternatively, by relying on confirmation from the user devices in the MPC cohort that a signing policy (or portion thereof) has been completed and thus enforcement has been met, the platform also lessens the amount of system configuration that is needed to be performed when adding a new protocol to support. For example, by providing this abstraction layer, the platform may use switch statements for new protocol updates to the user devices in the MPC cohort, greatly reducing the technical burden as compared to reconfiguring the user devices in the MPC cohort to support the new protocol (e.g., adding new hash functions, signing curves, etc.). In another example of a technical benefit, by providing this abstraction layer, the platform increases its scalability to meet computational demand as the platform becomes stateless. This stateless nature allows for any number of coordinators to be brought online for the platform, while allowing processes for a task to be moved between the platform's coordinators without interrupting the completion of the task.

For example, a switch statement is a type of selection control mechanism used to allow the value of a variable or expression to change the control flow of program execution via search and map. Unlike if-then and if-then-else statements, the switch statement can have a number of possible execution paths. A switch works with the byte, short, char, and int primitive data types.

Switch statements come in two main variants. Statements of the first form are structured switches, as in Pascal, where exactly one branch is taken, and the cases are treated as separate, exclusive blocks. This functions as a generalized if-then-else conditional, here with any number of branches, not just two. Statements of the second form are unstructured switches, as in the C programming language, where the cases are treated as labels within a single block, and the switch functions as a generalized go-to. This distinction is referred to as the treatment of fallthrough, which is described in more detail below.

With respect to the configuration of the platform featuring this abstraction layer, the platform may comprise a common interface for the devices to perform specific cryptographic tasks (e.g., blockchain operations) while providing end-toend encryption as tasks are performed. For example, the platform may comprise a coordinator that receives intermediate communications, during an MPC signing procedure, in an encrypted form. The coordinator may, without receiving messages of the intermediate communications in plain text or otherwise unencrypting the intermediate communications, transmit the received intermediate communications to other user devices in the MPC cohort to continue the MPC signing procedure. For example, instead of the coordinator enforcing signing policy rules, the coordinator simply directs the communications to the user devices in the MPC cohort. As the intermediate communications remain encrypted, the need for maintaining a secure broadcast channel is minimized. As such, only a result of a task (e.g., a signature that will be added to a blockchain) is required to be received by the platform in an unencrypted form and along a secure channel. For example, the user devices in an MPC cohort that are involved in the individual tasks may treat the coordinator as an untrusted party, which increases security for the task.

End-to-end encryption is a method of secure communication that prevents third parties from accessing data while the data is transferred from one end system or device to another. In end-to-end encryption, the data is encrypted on the sender's system or device, and only the intended recipient can decrypt it. As described herein, the platform and user devices (as well as other devices) may use multiple instances of end-to-end encryption and/or multiple instances of end-to-end encryption between different devices. For example, in one embodiment, the platform may initiate end-to-end encryption between a remote coordination server (e.g., remote coordination server 104) and one or more user devices (e.g., user devices 106 and 108). Additionally or alternatively, the one or more user devices (e.g., user devices 106 and 108) may engage in end-to-end encryption between the one or more user devices (e.g., user devices 106 and 108) and always-on server 102. For example, the platform may uses different instances of end-to-end encryption, which are distinguished by which set of devices have access to the data, in order to provide a multi-tier MPC signing procedure.

For example, during a first tier of the MPC signing procedure (e.g., during which a first set of communications is exchanged), the procedure may be conducted with a first end-to-end encryption (e.g., an end-to-end encryption to prevent remote coordination server 104, always-on server 102, and/or any other device from accessing respective messages exchanged between one or more user devices (e.g., user devices 106 and 108). Additionally or alternatively, during a second tier of the MPC signing procedure (e.g., during which a second set of communications is exchanged), the procedure may be conducted with a second end-to-end encryption (e.g., an end-to-end encryption to prevent remote coordination server 104, user device 108, and/or any other device from accessing respective messages exchanged between a particular user device (e.g., user devices 106) and always-on server 102.

The platform featuring this abstraction layer also provides downstream technical benefits with respect to enabling a novel two-tiered MPC signing procedure. For example, a technical issue with conventional MPC signing procedures is that it requires all human cosigners (e.g., user devices in an MPC cohort) to be online at one time. This results in a technical bottleneck for completing MPC signatures as the user devices are rarely online simultaneously. To address this problem, the platform implements a two-tiered MPC signing procedure.

For example, the technical benefit of the two-tiered MPC signing procedure is that it allows otherwise synchronous digital signature protocols to be performed asynchronously while still maintaining the security benefits of the MPC signing procedure. For example, during a first tier of the MPC signing procedure, the platform may allow up to a threshold number of user devices (e.g., human cosigners) to pre-approve a requested blockchain operation by submitting their respective digital signatures. When the MPC signing procedure (e.g., as enforced by the user devices in the MPC cohort) has received enough valid approvals (or the platform's coordinator receives a confirmation that the pre-approval component of the signing process has been completed), a second component of the two-of-two signing process may be performed to meet the digital signature requirement for a blockchain operation. For example, as the signing policy (and its enforcement) may be abstracted out of the platform, the platform may bifurcate the MPC signing procedure into asynchronous and synchronous tiers. As such, the signing policy for the MPC signing procedure may enforce different response times for communications in the two tiers. For example, the response time threshold for communications in the first tier may be higher (e.g., corresponding to slower responses due to some user devices being offline), while the response time threshold for communications in the second tier may be lower (e.g., corresponding to near-instantaneous response of an always-on coordinator).

The platform featuring this abstraction layer also provides downstream technical benefits with respect to maintaining a secure broadcast channel using MPC cohort management groupings within a novel network architecture. For example, as stated above, a technical challenge faced by MPC signing procedures is the maintenance of a secure broadcast channel as the platform increasingly serves non-traditional users (e.g., non-institutional users, geographically remote users, etc.) that interact with the platform from mobile devices and while on the go (e.g., on devices and/or in locations where maintaining secure broadcast channels is not feasible). While the use of the abstraction layer allows for some operations to be performed asynchronously (e.g., minimizing the need for a continuous, secure broadcast channel), the platform may still need to ensure that some operations are synchronous (and thus, e.g., require a secure broadcast channel). To overcome this technical challenge, the platform may use MPC cohort management groupings featuring a first group comprising user devices in the MPC cohort and a second group comprising an always-available, cloud-based server (e.g., a server sage). Additionally, the different groups may have different signing policies. For example, a first signing policy (e.g., for the first group) may require a threshold number of user devices to approve a blockchain operation, but the first signing policy may allow for the approvals to be received asynchronously (e.g., which may be beneficial in environments without reliable broadcast channels). A second signing policy (e.g., for a second group) may require a synchronous two-of-two signing protocol, but the second signing policy may dynamically determine what user device to include (e.g., along with an always-available server) for the two-of-two signing protocol (e.g., assuring that the user is available for the two-of two signing protocol).

It should not that the composition of cohort groups may vary in different embodiments. For example, a cohort group in one embodiment may comprise one or more user devices (e.g., user devices 106 and 108) and always-on server (e.g., always-on server 102). The cohorts may thus be distinguished by the devices that comprise the cohorts as well as the cohort policies of each cohort. For example, a tECDSA implementation the platform may enforce signing with arbitrary thresholds ("t-of-n"), but the platform may force specialization to 2-of-2 signing policy with a quorum of approvals from a given cohort based on a signing policy. In such cases, the two devices must belong to separate cosigner groups (e.g., cohorts). As a specific example, this may include one human (any user device controlled by a human in the cohort) and a server sage (e.g., always-on server 102).

Additionally or alternatively, a cohort group may have a signing policy that enforces different rules at each tier of the MPC signing procedure. For example, the cohort group may comprise a single cohort as having a group of user devices and a server sage. However, the signing policy may require specific members (e.g., a human and/or any user device controlled by a human in the cohort) to perform particular actions and/or provide approval during specific tiers. For example, the platform may force specialization to 2-of-2 signing policy with a quorum of approvals from a given cohort based on a signing policy where two devices must belong to the same cosigner group (e.g., cohort), but the signing policy for a given tier must include at least one human (any user device controlled by a human in the cohort) and/or a server sage (e.g., always-on server 102). In some embodiments, a single cohort group may enforce different signing policies based on the tier of the MPC signing procedure. For example, a first tier may have a first signing policy, while a second tier may have a different signing policy.

Each group may include multiple devices, each with their own device keys, which are all equivalent for signature computation purposes. Only one representative from a given group is required to participate in a given digital signature computation, and the platform's signature computation requires one representative from each group (e.g., the server sage and any one of the user devices in the MPC cohort). As the server sage is always available, the need for the secure broadcast channel is met; thus only a secure broadcast channel for the one of the user devices in the MPC cohort is required for the two-of-two signing process. By requiring only one user device to maintain the secure broadcast channel, the risk of a blockchain operation failure due to a lack of the MPC digital signing procedure being completed is greatly reduced.

For example, synchronous data transmission is a data transfer method in which a continuous stream of data signals (e.g., in blocks or frames) is accompanied by timing signals. During synchronous transmission, users need to wait until sending finishes before getting a response from the server. The timing signals (or clock signals) ensure that data is sent and/or received within a given time threshold (e.g., in terms of seconds, milliseconds, microseconds, etc.). In some embodiments, synchronous transmission uses a clocking electrical system at both transmitting and receiving stations. This ensures that the communication process is synchronized, and the interval of transmission is constant.

In contrast, asynchronous transmission sends data from the sender to the receiver using a flow control method. Asynchronous transmission does not use a clock to synchronize data between the source and the destination. Instead, asynchronous transmission sends one character, or 8 bits, at a time. In this method, before the transmission process begins, each character sends the start bit. After sending the character, it also sends the stop bit. With the character bits and start and stop bits, the total number of bits is 10 bits. For example, users do not have to wait until sending completes before receiving a response from the server. The time interval of transmission may thus be random.

The use of the aforementioned two-tiered MPC signing procedure allows for a first tier (which is asynchronous) to be conducted at lower cost, be more economical, and perform in unstable connection conditions. The system may then perform a second tier (which is synchronous) that may be faster and more secure.

FIG. 1 shows an illustrative platform architecture for a production service for computing signatures during MPC signing procedures comprising an abstraction layer, in accordance with one or more embodiments. For example, FIG. 1 shows platform 100. Platform 100 includes user devices 106 and 108, which may correspond to cosigner devices. As referred to herein, a user device (or client device) may comprise a cosigner device. As referred to herein, a "cosigner" may comprise a participant in a distributed signing protocol. The system may have both human cosigners (e.g., devices that correspond to, and receive inputs from, humans) and an automated server cosigner (e.g., a device that performs operations automatically based on predetermined rules or software instructions, and/or without direct human instruction). The server cosigner or remote coordination server may be an application programming interface (API) that accepts signature requests and facilitates their computation by cosigners.

As described herein, remote coordination server 104 may provide a production service that includes an abstraction layer in which cosigners communicate with the remote coordination server and not directly with each other.

The cosigner device may comprise an MPC cohort or simply a cohort. As referred to herein, a "cohort" refers to a set of human/server cosigners that can approve and participate in signature computations. In some embodiments, a cohort may comprise multiple cosigner groups and a signing approval policy. For example, a signing approval policy (or simply a signing policy) may indicate that a cosigner has reviewed the message to be signed and approved it for signing. The signing policy may be completed by generating a digital signature from a human cosigner, indicating that the signing policy has been met. For example, a signing approval policy may be set at the cohort level, specifying how many approvals a signing task must receive before platform 100 will allow the signature computation to proceed.

In some embodiments, a cohort management group (or cosigner group) may include a collection of cosigners, each with their own device keys, who are all equivalent for signature computation purposes. In some embodiments, only one representative from a given cosigner group can participate in a given signature computation. For example, tECDSA cohorts contain a server group (which may in some embodiments include remote coordination server 104) and a human/approver group (containing device keys for each human in the group). The platform's signature computation may take place between one representative from each group: always-on server 102 and any one user device (e.g., user device 106 or user device 108). For example, the platform may provide a two-tier approach. For example, during a first tier of the MPC signing procedure, the platform may allow up to a threshold number of user devices (e.g., human cosigners) to pre-approve a requested blockchain operation by submitting their respective digital signatures. When the MPC signing procedure (e.g., as enforced by the user devices in the MPC cohort) has received enough valid approvals (or the platform's coordinator receives a confirmation that the pre-approval component of the signing process has been completed), a second component of the two-of-two signing process may be performed to meet the digital signature requirement for a blockchain operation. The process may be performed between one of the user devices (e.g., user device 106 or user device 108) and always-on server 102 (e.g., a "server sage").

Always-on server 102 may comprise an always-on or always available network solution and/or components. For example, always-on server 102 may comprise a server or database within a set of availability servers/databases hosted with an availability replica. An availability replica provides redundancy only at the server/database level for the set of availability servers/databases. Additionally or alternatively, always-on server 102 may comprise a component with that is always active, operating, and/or powered an always-on Internet connection. Always-on server 102 may comprise an independent power, network connection, etc. to ensure access to it and its data.

Platform 100 may generate and import a signing key (e.g., corresponding to a digital wallet and/or user account) that may be allocated to platform 100 before signatures can be requested using it. After a user device (e.g., a cosigner) has allocated a key, the user device can request signatures using it. When remote coordination server 104 receives a request for a signature, remote coordination server 104 creates a signing task and waits for further action by cosigners (approvals and participation). The client can then request the status of the signing task by its signing identifier. Once the signature has been computed, the signature is returned as part of that response.

Remote coordination server 104 may use an abstraction layer that allows for the signature computation API to be housed, implemented, and/or enforced by the user devices. For example, once a signing task has been created for a given signing key, the next step is for a quorum of human cosigners (from the cohort which owns the key) to submit approvals. The required size of the quorum is defined in the cohort's signing approval policy. Notably, this enforcement is not required to be done by the remote coordination server 104. In such a case, the human cosigners belonging to the cohort are queried to review and approve the transaction details in their cosigner client. As such, remote coordination server 104 is not a trusted party in the signature computation.

Once the approval quorum is met, remote coordination server 104 will signal to the final approver that the final approver can now participate in the computation. When that cosigner begins participation, remote coordination server 104 signals to the server sage to also participate. Only one human cosigner and one server sage are required to participate in the 2-of-2 threshold signing.

The cosigners exchange several messages (end-to-end encrypted, but routed via remote coordination server 104), resulting in both computing the signature for the message given as input. Cosigners report the signature (which is not sensitive data), and platform 100 may publish it on a blockchain. Additionally, remote coordination server 104 may store a record that the signing task as complete.

Figure 2:
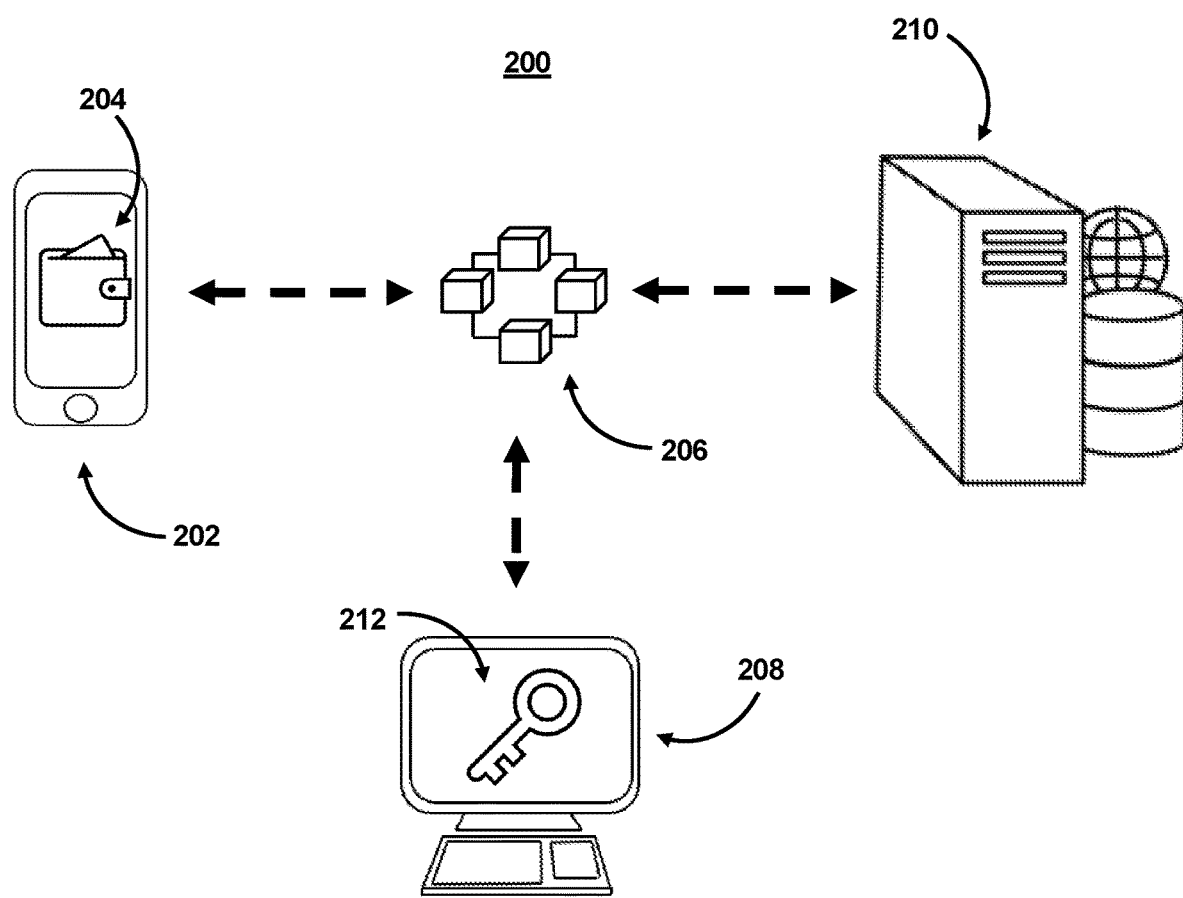
FIG. 2 shows an illustrative diagram for conducting blockchain operations, in accordance with one or more embodiments.

FIG. 2 shows an illustrative diagram for conducting blockchain operations, in accordance with one or more embodiments. For example, the diagram presents various components that may be used by an MPC key system in some embodiments. FIG. 2 includes user device 202. User device 202 may include a user interface. As referred to herein, a "user interface" may comprise a mechanism for human-computer interaction and communication on a device and may include inputs devices, display screens, keyboards, a mouse, and the appearance of a desktop. For example, a user interface may comprise a way a user interacts with an application or website using an MPC key system, and the user interface may display content related to performing blockchain operations based on an MPC key system and/or a digital signing process using an MPC key system. As referred to herein, "content" should be understood to mean an electronically consumable user asset, representations of goods or services (including nonfungible tokens), internet content (e.g., streaming content, downloadable content, webcasts, etc.), video data, audio data, image data, and/or textual data, etc.

As shown in FIG. 2, system 200 may include multiple user devices (e.g., user device 202, user device 208, and/or user device 210). For example, system 200 may comprise a distributed state machine, in which each of the components in FIG. 2 acts as a client of system 200. For example, system 200 (as well as other systems described herein) may comprise a large data structure that holds not only all accounts and balances but also a state machine, which can change from block to block according to a predefined set of rules and which can execute arbitrary machine code. The specific rules of changing state from block to block may be maintained by a virtual machine (e.g., a computer file implemented on and/or accessible by a user device, which behaves like an actual computer) for the system.

It should be noted that, while shown as a smartphone, a personal computer, and a server in FIG. 2, the user devices may be any type of computing device, including, but not limited to, a laptop computer, a tablet computer, a hand-held computer, and/or other computing equipment (e.g., a server), including "smart," wireless, wearable, and/or mobile devices. It should be noted that embodiments describing system 200 performing a blockchain operation may equally be applied to, and correspond to, an individual user device (e.g., user device 202, user device 208, and/or user device 210) performing the blockchain operation. That is, system 200 may correspond to the user devices (e.g., user device 202, user device 208, and/or user device 210) collectively or individually.

Each of the user devices may be used by the system to conduct blockchain operations and/or contribute to digital signing processes based on an MPC key system. As referred to herein, "blockchain operations" may comprise any operations including and/or related to blockchains and blockchain technology. For example, blockchain operations may include conducting transactions, querying a distributed ledger, generating additional blocks for a blockchain, transmitting communications-related nonfungible tokens, performing encryption/decryption, exchanging public/private keys, and/or other operations related to blockchains and blockchain technology. In some embodiments, a blockchain operation may comprise the creation, modification, detection, and/or execution of a smart contract or program stored on a blockchain. For example, a smart contract may comprise a program stored on a blockchain that is executed (e.g., automatically, without any intermediary's involvement or time loss) when one or more predetermined conditions are met. In some embodiments, a blockchain operation may comprise the creation, modification, exchange, and/or review of a token (e.g., a digital asset—specific blockchain), including a nonfungible token. A nonfungible token may comprise a token that is associated with a good, a service, a smart contract, and/or other content that may be verified by, and stored using, blockchain technology.

In some embodiments, blockchain operations may also comprise actions related to mechanisms that facilitate other blockchain operations (e.g., actions related to metering activities for blockchain operations on a given blockchain network). For example, Ethereum, which is an open-source, globally decentralized computing infrastructure that executes smart contracts, uses a blockchain to synchronize and store the system's state changes. Ethereum uses a network-specific cryptocurrency called ether to meter and constrain execution resource costs. The metering mechanism is referred to as "gas." As the system executes a smart contract, the system accounts for every blockchain operation (e.g., computation, data access, transaction, etc.). Each blockchain operation has a predetermined cost in units of gas (e.g., as determined based on a predefined set of rules for the system). When a blockchain operation triggers the execution of a smart contract, the blockchain operation may include an amount of gas that sets the upper limit of what can be consumed in running the smart contract. The system may terminate execution of the smart contract if the amount of gas consumed by computation exceeds the gas available in the blockchain operation. For example, in Ethereum, gas comprises a mechanism for allowing Turing-complete computation while limiting the resources that any smart contract and/or blockchain operation may consume.

In some embodiments, gas may be obtained as part of a blockchain operation (e.g., a purchase) using a network-specific cryptocurrency (e.g., ether in the case of Ethereum). The system may require gas (or the amount of the network-specific cryptocurrency corresponding to the required amount of gas) to be transmitted with the blockchain operation as an earmark to the blockchain operation. In some embodiments, gas that is earmarked for a blockchain operation may be refunded back to the originator of the blockchain operation if, after the computation is executed, an amount remains unused.

As shown in FIG. 2, one or more user devices may include a digital wallet (e.g., digital wallet 204) used to perform blockchain operations. For example, the digital wallet may comprise a repository that allows users to store, manage, and trade their cryptocurrencies and assets, interact with blockchains, and/or conduct blockchain operations using one or more applications. The digital wallet may be specific to a given blockchain protocol or may provide access to multiple blockchain protocols. In some embodiments, the system may use various types of wallets such as hot wallets and cold wallets. Hot wallets are connected to the internet while cold wallets are not. Most digital wallet holders hold both a hot wallet and a cold wallet. Hot wallets are most often used to perform blockchain operations, while a cold wallet is generally used for managing a user account and may have no connection to the internet.

As shown in FIG. 2, one or more user devices may include a private key (e.g., key 212) and/or a digital signature. For example, system 200 may use cryptographic systems for conducting blockchain operations based on MPC key systems. For example, system 200 may use public-key cryptography, which features a pair of digital keys (e.g., which may comprise strings of data). In such cases, each pair comprises a public key (e.g., which may be public) and a private key (e.g., which may be kept private). System 200 may generate the key pairs using cryptographic algorithms (e.g., featuring one-way functions). System 200 may then encrypt a message (or other blockchain operation) using an intended receiver's public key such that the encrypted message may be decrypted only with the receiver's corresponding private key. In some embodiments, system 200 may combine a message with a private key to create a digital signature on the message. For example, the digital signature may be used to verify the authenticity of blockchain operations. As an illustration, when conducting blockchain operations, system 200 may use the digital signature to prove to every node in the system that it is authorized to conduct the blockchain operations.

For example, system 200 may comprise a plurality of nodes for the blockchain network. Each node may correspond to a user device (e.g., user device 208). A node for a blockchain network may comprise an application or other software that records and/or monitors peer connections to other nodes and/or miners for the blockchain network. For example, a miner comprises a node in a blockchain network that facilitates blockchain operations by verifying blockchain operations on the blockchain, adding new blocks to the existing chain, and/or ensuring that these additions are accurate. The nodes may continually record the state of the blockchain and respond to remote procedure requests for information about the blockchain.

For example, user device 208 may request a blockchain operation (e.g., conduct a transaction). The blockchain operation may be authenticated by user device 208 and/or another node (e.g., a user device in the community network of system 200). For example, using cryptographic keys, system 200 may identify users and give access to their respective user accounts (e.g., corresponding digital wallets) within system 200. Using private keys (e.g., known only to the respective users) and public keys (e.g., known to the community network), system 200 may create digital signatures to authenticate the users.

Following an authentication of the blockchain operation (e.g., using key 212), the blockchain operation may be authorized. For example, after the blockchain operation is authenticated between the users, system 200 may authorize the blockchain operation prior to adding it to the blockchain. System 200 may add the blockchain operation to blockchain 206. System 200 may perform this based on a consensus of the user devices within system 200. For example, system 200 may rely on a majority (or other metric) of the nodes in the community network (e.g., user device 202, user device 208, and/or user device 210) to determine that the blockchain operation is valid. In response to validation of the block, a node user device (e.g., user device 202, user device 208, and/or user device 210) in the community network (e.g., a miner) may receive a reward (e.g., in a given cryptocurrency) as an incentive for validating the block.

To validate the blockchain operation, system 200 may use one or more validation protocols and/or validation mechanisms. For example, system 200 may use a proof-of-work mechanism in which a user device must provide evidence that it performed computational work to validate a blockchain operation and thus this mechanism provides a manner for achieving consensus in a decentralized manner as well as preventing fraudulent validations. For example, the proof-of-work mechanism may involve iterations of a hashing algorithm. The user device that is successful aggregates and records blockchain operations from a mempool (e.g., a collection of all valid blockchain operations waiting to be confirmed by the blockchain network) into the next block. Alternatively or additionally, system 200 may use a proof-of-stake mechanism in which a user account (e.g., corresponding to a node on the blockchain network) is required to have, or "stake," a predetermined amount of tokens in order for system 200 to recognize it as a validator in the blockchain network.

In response to validation of the block, the block is added to blockchain 206, and the blockchain operation is completed. For example, to add the blockchain operation to blockchain 206, the successful node (e.g., the successful miner) encapsulates the blockchain operation in a new block before transmitting the block throughout system 200.

In some embodiments, FIG. 2 may represent a series of components and/or interactions between user devices in a multi-party computation key system. For example, user device 202 may initiate a blockchain operation using a multi-party computation key system. For example, user device 202 may send a signing request to a system coordinator (e.g., user device 210). In this embodiment, user device 210, acting as the system coordinator, may maintain custodial access of one or more private keys (or partial private keys in an MPC key system utilizing partial private keys) for the MPC key system. For example, the system coordinator may act as a remote server (or a network of computing devices) that hosts a custodial platform for blockchain operations (e.g., as further described in FIG. 4 below).

User device 202 may transmit a signing request to user device 210. The signature request may be based on a private key owner (e.g., keychain) requesting a digital signature algorithm (e.g., an Elliptic Curve Digital Signature Algorithm (ECDSA) or a threshold-based ECDSA (tECDSA)) from the coordinator. Once signature production completes, user device 210 may transmit a valid ECDSA signature back to user device 202. To do so, the system (e.g., user device 210) may coordinate with other user devices in the MPC key system. For example, user device 210 may forward messages (e.g., based on the initial signing request) to various other user devices in the MPC key system. Each forwarded message may request in round data being returned from the other user devices that comprises a message with each user device's contribution to the key-signing process. Each user device (e.g., a cosigner to the requested blockchain operation) thus communicates with the centralized communicator (e.g., user device 210) to facilitate the MPC key-signing ceremony and cause the blockchain operation to be completed based on the signing request.

In some embodiments, the coordinator may receive signing requests from a user API and broadcast messages from cosigners to other cosigners. In such cases, the coordinator may only know that a signing operation is pending. Specifically, the coordinator may determine what signature is expected, what threshold (if any) is needed to complete the operation, other signing criteria based on a signing policy (e.g., how long to wait for cosigners to indicate participation), and/or cosigner information (e.g., address identifications) for requesting cosigners' participation until the threshold is reached. The coordinator may also determine whether a signing operation is in progress. For example, the coordinator may store and forward messages that cosigners send to each other and know who the message is for (but not its contents). The coordinator may also determine whether a signing operation has completed (e.g., whether the completed signature is returned to the user API).

In contrast, cosigners (e.g., user devices) may indicate willingness to participate in a signing operation. Once conscripted by the coordinator, the cosigner receives the key material and the message to be signed from the coordinator for that operation. Cosigners may store a signing state (e.g., a tECDSA requires storing computations between rounds and determining which round to compute next), a secure broadcast channel state (e.g., comprising channel hashes and encryption keys), and/or the identity (and/or addresses) of other cosigners.

The system may use an integrated encryption scheme (e.g., an Elliptic Curve Integrated Encryption Scheme) to encrypt bundles for each cosigner. Each cosigner receives, from the system, the public parameters (ECDSA public key, ECDSA public shares, proof parameters, Paillier encryption keys) and their own ECDSA secret key share and Paillier decryption key.

To perform blockchain operations in the MPC key system, the system may use three phases (e.g., key generation, conscription, and signing). The system may first enable key generation (e.g., as described in FIGS. 6A-C). For conscription, the system may use a threshold digital signing algorithm (e.g., tECDSA) that requires a given number of signers (and in some embodiments the same signers) to participate in all rounds of the protocol. By doing so, the system may register the participating cosigners and establish a secure (e.g., group messaging) channel between them. Eligible cosigners may indicate their eligibility to the coordinator for signing operations in response to queries from the coordinator.

To ensure forward secrecy, as cosigners are conscripted to participate, the system may require each cosigner to post an ephemeral public key to the coordinator (e.g., a remote server hosting a custodial platform for blockchain operations). Once all cosigners have been conscripted, each cosigner may generate a random 32-byte value and encrypt it for each of the other cosigners before transmitting. These values are used for initial group input key material and for pubkey encryption in round two of a signing process. Once the coordinator has conscripted the required number of signers to complete a signing operation, those signers are locked in and no other signers may participate in generating a particular signature. These participants are the cosigners. Cosigners are given each other's encrypted ephemeral public keys from which the group encryption key is derived.

After a cosigner computes a round, the output from the cosigner is encrypted and sent to the coordinator. The coordinator may wait to receive the broadcast outputs from all the signer rounds. After receiving all broadcast values, the coordinator may forward the broadcast values from all cosigners. For example, if three cosigners are participating, cosigner one would receive messages from cosigners two and three. Cosigner two would receive messages from one and three. Cosigner three would receive messages from one and two. In additionally broadcasting signing rounds, a cosigner may also transmit abort messages that are sent to the coordinator if signing proof verification fails or a message fails to decrypt. The coordinator then forwards the abort to all cosigners, who promptly perform a secure memory wipe. The abort messages need not be encrypted. Aborts can help to detect a malicious cosigner or other abnormal activity. Additionally, rounds 1, 3, 4, 5, 6 may use the group key encryption with AES 128 GCM, while round 2 may use end-to-end encryption rather than the broadcast encryption used by the other rounds.

Figure 3:
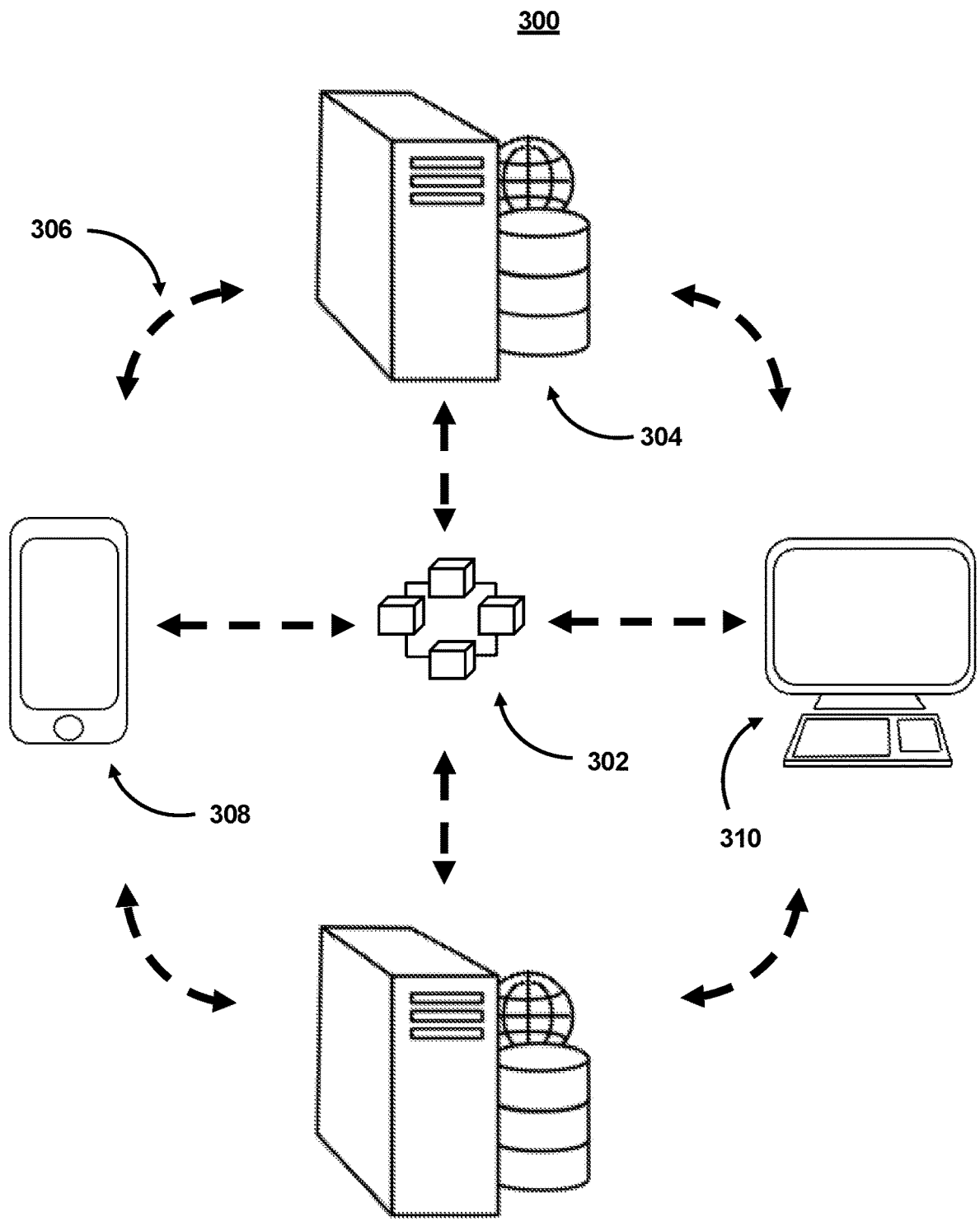
FIG. 3 shows an illustrative diagram for a decentralized application, in accordance with one or more embodiments.

FIG. 3 shows an illustrative diagram for a decentralized application, in accordance with one or more embodiments. For example, in some embodiments, system 300 may use an MPC key system within a decentralized application environment. A decentralized application may comprise an application that exists on a blockchain (e.g., blockchain 302) and/or a peer-to-peer network (e.g., network 306). That is, a decentralized application may comprise an application that has a back end that is in part powered by a decentralized peer-to-peer network such as a decentralized, open-source blockchain with smart contract functionality.

For example, network 306 may allow user devices (e.g., user device 304) within network 306 to share files and access. In particular, the peer-to-peer architecture of network 306 allows blockchain operations (e.g., corresponding to blockchain 302) to be conducted between the user devices in the network, without the need of any intermediaries or central authorities.

In some embodiments, the user devices of system 300 may comprise one or more cloud components. For example, cloud components may be implemented as a cloud computing system and may feature one or more component devices. It should also be noted that system 300 is not limited to four devices. Users may, for instance, utilize one or more devices to interact with one another, one or more servers, or other components of system 300. It should be further noted that while one or more operations (e.g., blockchain operations) are described herein as being performed by a particular component (e.g., user device 304) of system 300, those operations may, in some embodiments, be performed by other components of system 300. As an example, while one or more operations are described herein as being performed by components of user device 304, those operations may, in some embodiments, be performed by one or more cloud components. In some embodiments, the various computers and systems described herein may include one or more computing devices that are programmed to perform the described functions. Additionally, or alternatively, multiple users may interact with system 300 and/or one or more components of system 300. For example, in one embodiment, a first user and a second user may interact with system 300 using two different components (e.g., user device 304 and user device 308, respectively). Additionally, or alternatively, a single user (and/or a user account linked to a single user) may interact with system 300 and/or one or more components of system 300 using two different components (e.g., user device 304 and user device 308, respectively).

With respect to the components of system 300, each of these devices may receive content and data via input/output (hereinafter "I/O") paths using I/O circuitry. Each of these devices may also include processors and/or control circuitry to send and receive commands, requests, and other suitable data using the I/O paths. The control circuitry may comprise any suitable processing, storage, and/or I/O circuitry. Each of these devices may also include a user input interface and/or user output interface (e.g., a display) for use in receiving and displaying data. For example, as shown in FIG. 3, both user device 308 and user device 310 include a display upon which to display data (e.g., content related to one or more blockchain operations). Additionally, the devices in system 300 may run an application (or another suitable program). The application may cause the processors and/or control circuitry to perform operations related to the use of an MPC key system within a decentralized application environment.

Each of these devices may also include electronic storages. The electronic storages may include non-transitory storage media that electronically stores information. The electronic storage media of the electronic storages may include one or both of (i) system storage that is provided integrally (e.g., is substantially non-removable) with servers or client devices, or (ii) removable storage that is removably connectable to the servers or client devices via, for example, a port (e.g., a USB port, a firewire port, etc.) or a drive (e.g., a disk drive, etc.). The electronic storages may include one or more optically readable storage media (e.g., optical disk, etc.), magnetically readable storage media (e.g., magnetic tape, magnetic hard drive, floppy drive, etc.), electrical charge-based storage media (e.g., EEPROM, RAM, etc.), solid-state storage media (e.g., flash drive, etc.), and/or other electronically readable storage media. The electronic storages may include one or more virtual storage resources (e.g., cloud storage, a virtual private network, and/or other virtual storage resources). The electronic storages may store software algorithms, information determined by the processors, information obtained from servers, information obtained from client devices, or other information that enables the functionality as described herein.

FIG. 3 also includes network 306, which may comprise communication paths between user devices. The communication paths may include the internet, a mobile phone network, a mobile voice or data network (e.g., a 5G or LTE network), a cable network, a public switched telephone network, or other types of communication networks or combinations of communication networks. The communication paths may separately or together include one or more communication paths, such as a satellite path, a fiber-optic path, a cable path, a path that supports internet communications (e.g., IPTV), free-space connections (e.g., for broadcast or other wireless signals), or any other suitable wired or wireless communication path or combination of such paths. The computing devices may include additional communication paths linking a plurality of hardware, software, and/or firmware components operating together. For example, the computing devices may be implemented by a cloud of computing platforms operating together as the computing devices.

Figure 4:
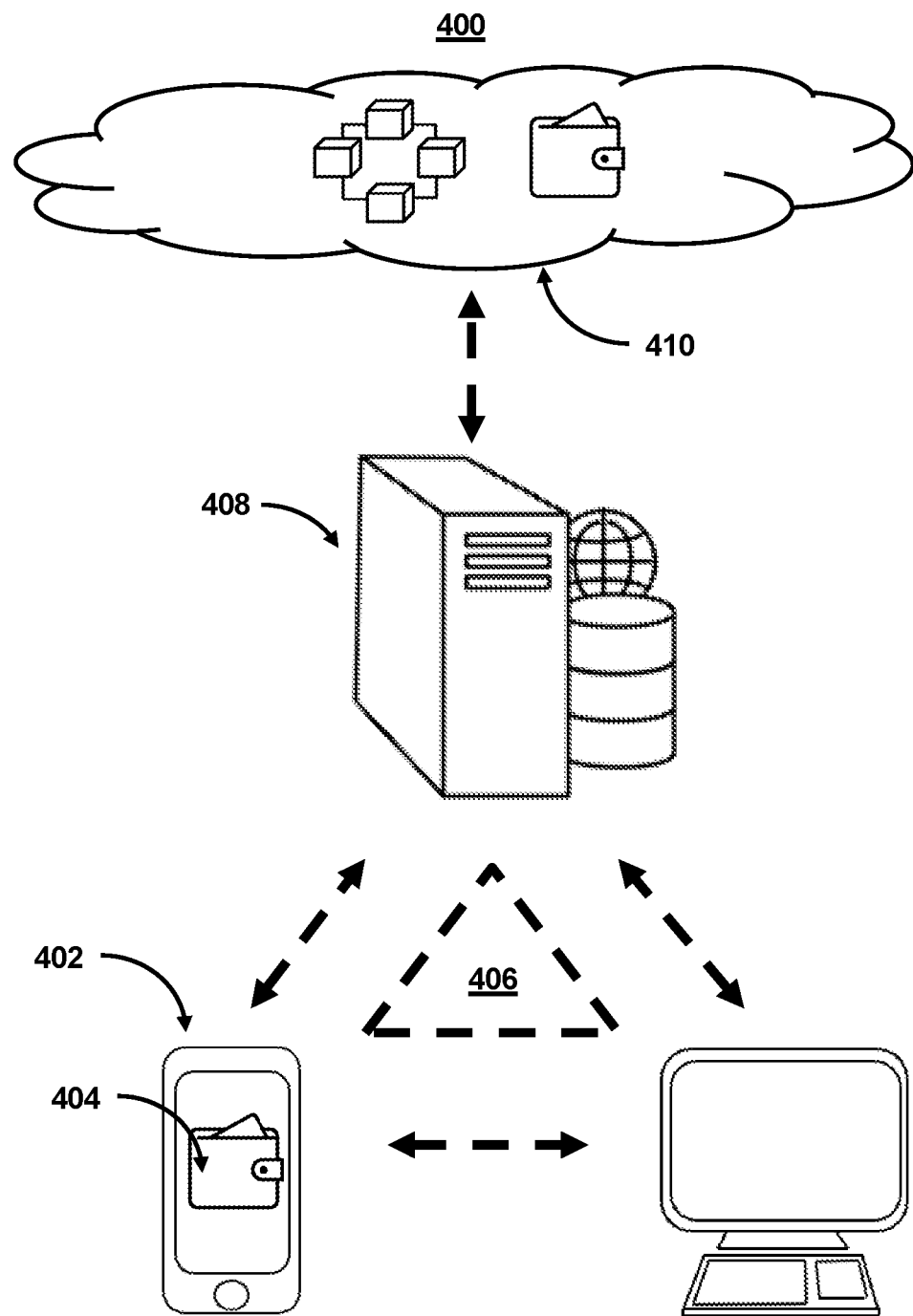
FIG. 4 shows an illustrative diagram for conducting operations in a decentralized application using blockchain operations, in accordance with one or more embodiments.

FIG. 4 shows an illustrative diagram for conducting operations in a decentralized application using blockchain operations, in accordance with one or more embodiments. For example, system 400 may include user device 402. Furthermore, user device 402 may comprise an application (e.g., application 404) that is implemented on, and/or accessible by, user device 402. For example, application 404 may interact with one or more other applications and/or application programming interfaces (APIs) in order to facilitate blockchain operations using MPC key systems. For example, application 404 may comprise a decentralized application digital wallet and/or wallet service that is able to sign and send transactions to transfer tokens and/or perform other blockchain operations as well as interact with one or more decentralized applications.

System 400 also includes API layer 406. In some embodiments, API layer 406 may be implemented on user device 402. Alternatively or additionally, API layer 406 may reside on one or more cloud components (e.g., server 408). For example, API layer 406 may reside on a server 408 and comprise a platform service for a custodial wallet service, decentralized application, etc. API layer 406 (which may be a REST or web services API layer) may provide a decoupled interface to data and/or functionality of one or more applications.

API layer 406 may provide various low-level and/or blockchain-specific operations in order to facilitate using MPC key systems. For example, API layer 406 may provide blockchain operations such as blockchain writes. Furthermore, API layer 406 may perform a transfer validation ahead of forwarding the blockchain operation (e.g., a transaction) to another service (e.g., a crypto service). API layer 406 may then log the outcome. For example, by logging to the blockchain prior to forwarding, the API layer 406 may maintain internal records and balances without relying on external verification (which may take up to 10 minutes, e.g., based on blockchain updating activity).

API layer 406 may also provide informational reads. For example, API layer 406 (or a platform service powered by API layer 406) may generate blockchain operation logs and write to an additional ledger (e.g., an internal record and/or indexer service) the outcome of the reads. If this is done, a user accessing the information through other means may see consistent information such that downstream users ingest the same data point as the user.

API layer 406 may also provide a unified API to access balances, transaction histories, and/or other blockchain operations activity records between one or more decentralized applications and custodial user accounts. By doing so, the system maintains the security of sensitive information such as the balances and transaction history. Alternatively, a mechanism for maintaining such security would separate the API access between the decentralized applications and the custodial user accounts through the use of special logic. The introduction of the special logic decreases the streamlining of the system, which may result in system errors based on divergence and reconciliation.

API layer 406 may provide a common, language-agnostic way of interacting with an application. In some embodiments, API layer 406 may comprise a web services API that offers a well-defined contract that describes the services in terms of their operations and the data types used to exchange information. REST APIs do not typically have this contract; instead, they are documented with client libraries for most common languages including Ruby, Java, PHP, and JavaScript. SOAP web services have traditionally been adopted in the enterprise for publishing internal services as well as for exchanging information with partners in business-to-business (B2B) transactions.

API layer 406 may use various architectural arrangements. For example, system 400 may be partially based on API layer 406, such that there is strong adoption of SOAP and RESTful web services, using resources such as Service Repository and Developer Portal, but with low governance, standardization, and separation of concerns. Alternatively, system 400 may be fully based on API layer 406, such that separation of concerns between layers such as API layer 406, services, and applications are in place.

In some embodiments, the system architecture may use a microservice approach. Such systems may use two types of layers: front-end layers and back-end layers, where microservices reside. In this kind of architecture, the role of the API layer 406 may be to provide integration between front-end and back-end layers. In such cases, API layer 406 may use RESTful APIs (exposition to front-end or even communication between microservices). API layer 406 may use the Advanced Message Queuing Protocol (AMQP), which is an open standard for passing business messages between applications or organizations. API layer 406 may use an open-source, high-performance remote procedure call (RPC) framework that may run in a decentralized application environment. In some embodiments, the system architecture may use an open API approach. In such cases, API layer 406 may use commercial or open-source API platforms and their modules. API layer 406 may use a developer portal. API layer 406 may use strong security constraints applying a web application firewall that protects the decentralized applications and/or API layer 406 against common web exploits, bots, and denial-of-service (e.g., DDoS) attacks. API layer 406 may use RESTful APIs as standard for external integration.

As shown in FIG. 4, system 400 may use API layer 406 to communicate with and/or facilitate blockchain operations with server 408. For example, server 408 may represent a custodial platform for blockchain operations. A custodial platform may manage private keys stored by a centralized service provider (e.g., server 408). In such cases, server 408 may interact with blockchain 410, a wallet service for blockchain 410, an indexer service for blockchain 410 (e.g., as described in FIG. 5), and/or other platform services.

For example, a wallet service may comprise an application and/or a software-based system that securely stores users' payment information, private keys, and/or passwords facilitating blockchain operations with websites, nodes, and/or other devices. In some embodiments, a wallet service may also provide additional ledger access (e.g., a second ledger). Furthermore, as discussed above, this second ledger may receive updates directly from API layer 406, as opposed to relying on data pulled directly from blockchain 410.

For example, system 400 may maintain its records (e.g., both live and for accounting) in good order separate from balances on blockchain 410. That is, system 400 may maintain an architecture featuring the second ledger, where balances are stored and updated, and the logs of blockchain operations. While conventional systems may rely on directly referencing blockchain 410, since the blockchain is the source of truth for the system, however, such reliance leads to additional technical problems.

First, there is a strong likelihood of impedance mismatch between a format for a platform service and the APIs used to retrieve data from the blockchain (e.g., which may lead to accounting imbalances). For example, system 400 may need to be able to generate accounting entries reflecting changes of balances. However, while changes of balances can be tracked by examining blockchain 410, this requires additional processing and computational power.

Second, accounting changes in a blockchain architecture should be irreversible. In practice, this is achieved for current blockchain operations by waiting for a variable number of confirmations from the blockchain (e.g., blockchain 410). By waiting for the variable number of confirmations, the likelihood of an error in the blockchain becomes infinitesimally small. However, while blockchain services rely on this methodology, this is not a rule inherent to the blockchain itself. That is, the blockchain does not have an inherent authentication mechanism that is dependent on a number of confirmations. Instead, the blockchain relies on an absolute system—blockchain operations are either recorded on a particular node or they are not.

As such, forks in the blockchain are always possible. In the case of a fork, system 400 may not follow the "right" fork for an undetermined amount of time. If that happens, and if, for the purpose of a custodial digital wallet, system 400 decides to move from one fork to another, system 400 may have a more straightforward mechanism to maintain an accurate history of a user account's positions if system 400 stores them independently from a given blockchain. Furthermore, in case of forks, system 400 performs some internal remediation on user accounts, which is enabled by system 400 maintaining a layer of insulation, from the blockchain, for remedial blockchain operations. For example, system 400 may have a separate storage, protected by the second ledger (e.g., a ledger service) for reads and by a transfer service for writes, that reflects the state of the blockchain that is relevant for system 400's purposes.

In some embodiments, the system may also use one or more Application Binary Interfaces (ABIs). An ABI is an interface between two program modules, often between operating systems and user programs. ABIs may be specific to a blockchain protocol. For example, an Ethereum Virtual Machine (EVM) is a core component of the Ethereum network, and a smart contract may be a piece of code stored on the Ethereum blockchain, which is executed on EVM. Smart contracts written in high-level languages like Solidity or Vyper may be compiled in EVM executable bytecode by the system. Upon deployment of the smart contract, the bytecode is stored on the blockchain and is associated with an address. To access functions defined in high-level languages, the system translates names and arguments into byte representations for byte code to work with it. To interpret the bytes sent in response, the system converts back to the tuple (e.g., a finite ordered list of elements) of return values defined in higher-level languages. Languages that compile for the EVM maintain strict conventions about these conversions, but in order to perform them, the system must maintain the precise names and types associated with the operations. The ABI documents these names and types precisely, and in an easily parseable format, making translations between human-intended method calls and smart-contract operations discoverable and reliable.

For example, ABI defines the methods and structures used to interact with the binary contract similar to an API, but on a lower level. The ABI indicates the caller of the function to encode (e.g., ABI encoding) the needed information, like function signatures and variable declarations, in a format that the EVM can understand to call that function in bytecode. ABI encoding may be automated by the system using compilers or wallets interacting with the blockchain.

Figure 5:
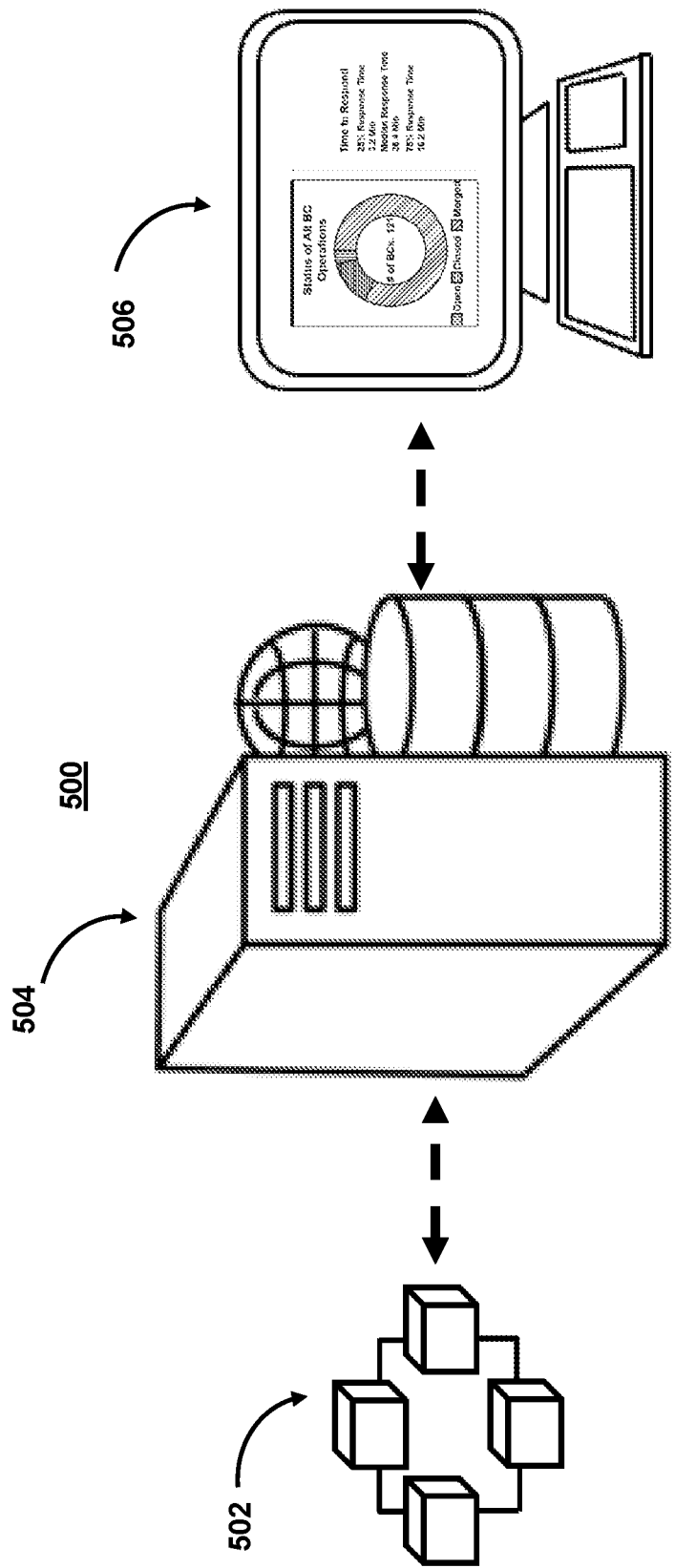
FIG. 5 shows an illustrative diagram for a blockchain indexer, in accordance with one or more embodiments.

FIG. 5 shows an illustrative diagram for a blockchain indexer, in accordance with one or more embodiments. For example, in some embodiments, the system may use indexer service 500 in conjunction with an MPC key system. Indexer service 500 may fetch raw data (e.g., data related to a current state and/or instance of blockchain 502) from a node of a blockchain network (e.g., as described above). Indexer service 500 may then process the data and store it in a database and/or data structure in an efficient way to provide quick access to the data. For example, indexer 504 may publish and/or record a subset of blockchain operations that occur for blockchain 502. Accordingly, for subsequent blockchain operations, indexer service 500 may reference the index at indexer 504 as opposed to a node of blockchain 502 to provide various services at user device 506.

For example, indexer 504 may store a predetermined list of blockchain operations to monitor for and/or record in an index. These may include blockchain operations (e.g., "operation included," "operation removed," "operation finalized") related to a given type of blockchain operation (e.g., "transaction," "external transfer," "internal transfer," "new contract metadata," "ownership change," etc.) as well as blockchain operations related to a given protocol, protocol subgroup, and/or other characteristic (e.g., "ETH," "ERC20," and/or "ERC721"). Additionally and/or alternatively, the various blockchain operations and metadata related to those blockchain operations (e.g., block designations, user accounts, time stamps, etc.) as well as an aggregate of multiple blockchain operations (e.g., total blockchain operations amounts, rates of blockchain operations, rate of blockchain updates, etc.) may be monitored and/or recorded.

Indexer 504 may likewise provide navigation and search features (e.g., support Boolean operations) for the indexed blockchain operations. In some embodiments, indexer 504 may apply one or more formatting protocols to generate representations of indexed blockchain operations in a human-readable format. In some embodiments, indexer 504 may also tag blockchain operations based on whether the blockchain operation originated for a local user account (e.g., a user account corresponding to a custodial account) and/or a locally hosted digital wallet. Indexer service 500 may determine whether a blockchain operation contains relevant information for users of indexer service 500 by storing information about whether an address is an internal address of indexer service 500 or one used in a digital wallet hosted by a predetermined wallet service.

Figure 6A:
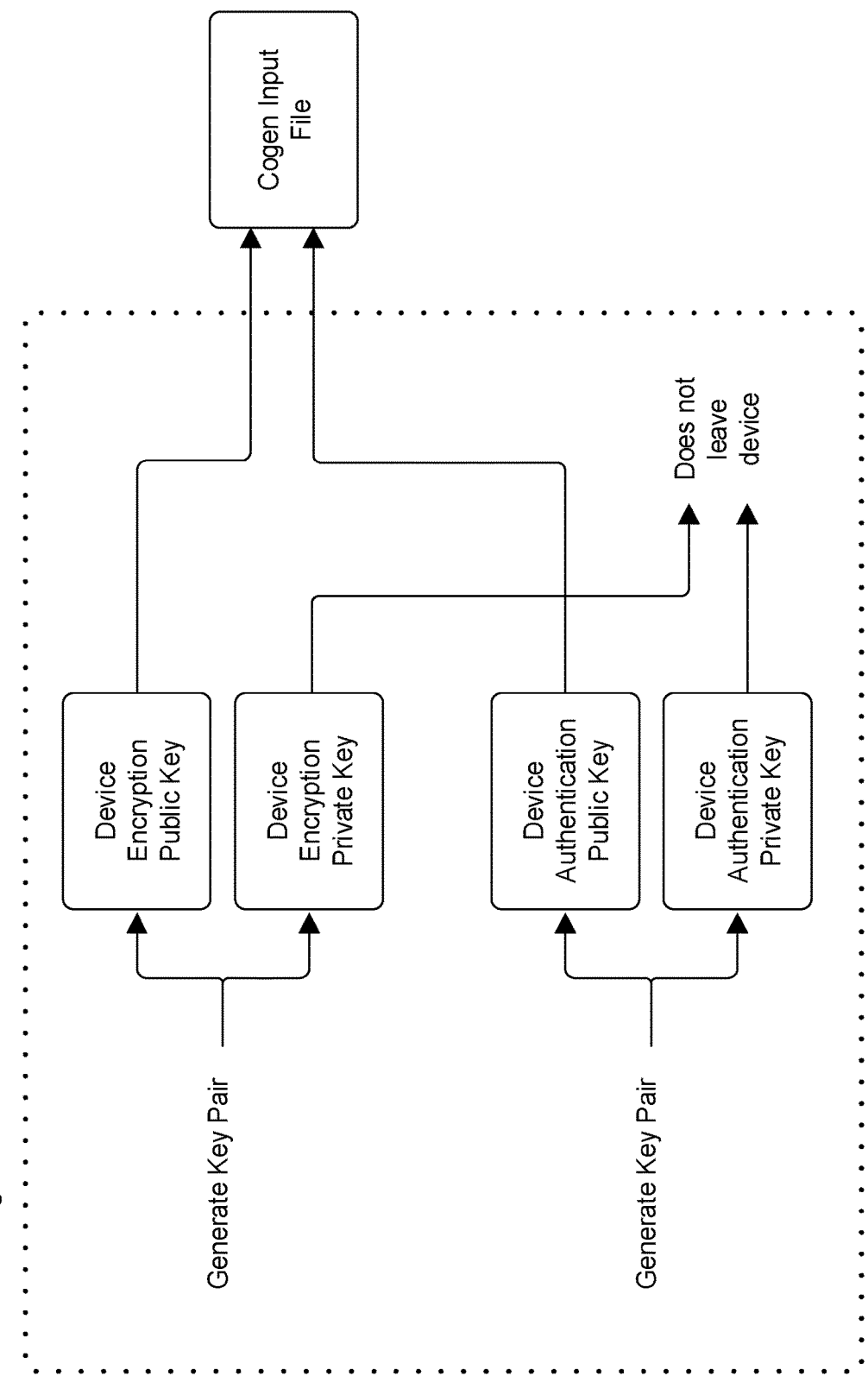
FIGS. 6A-C each show an illustrative diagram for a key generation ceremony, in accordance with one or more embodiments.
Figure 6B:
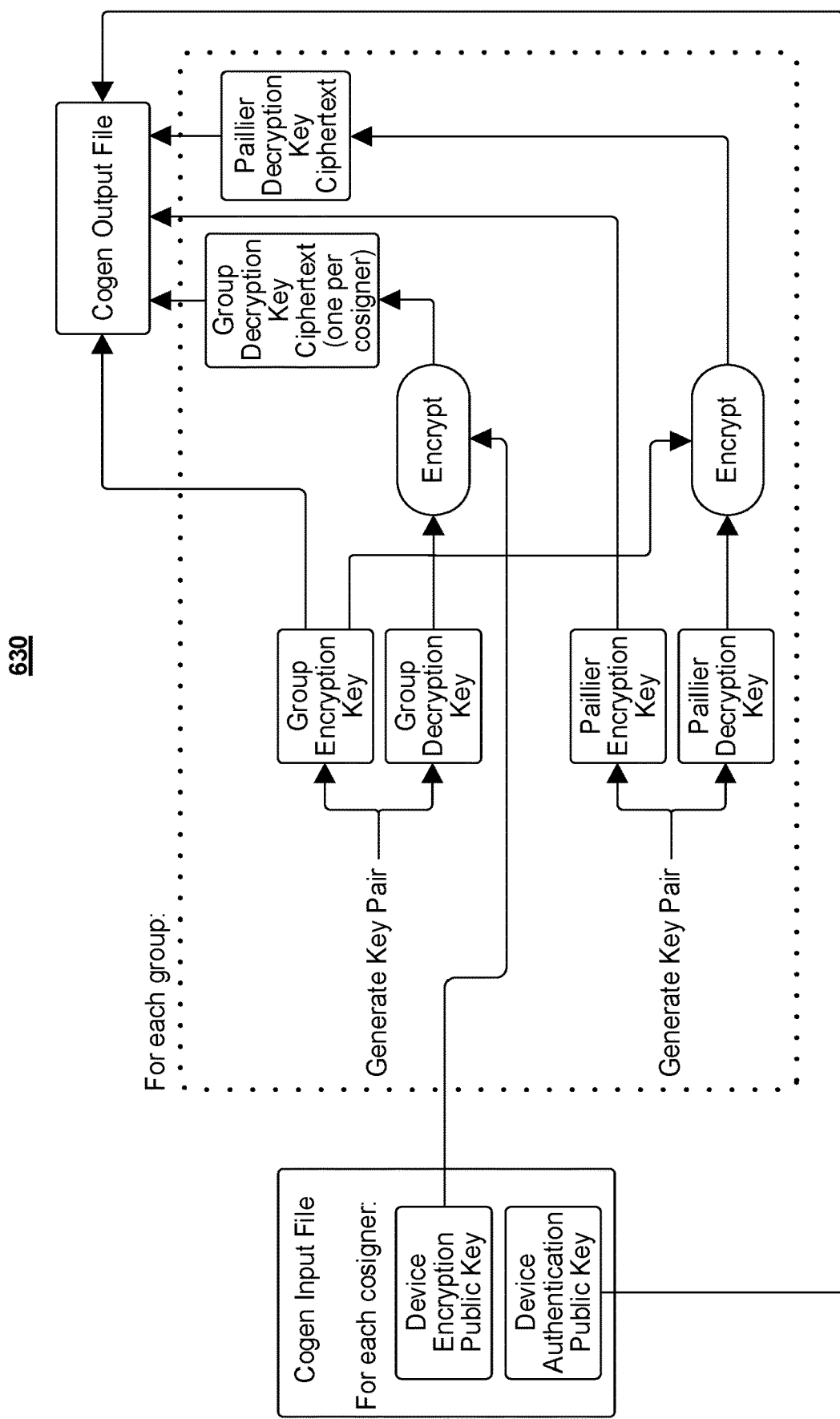
Figure 6C:
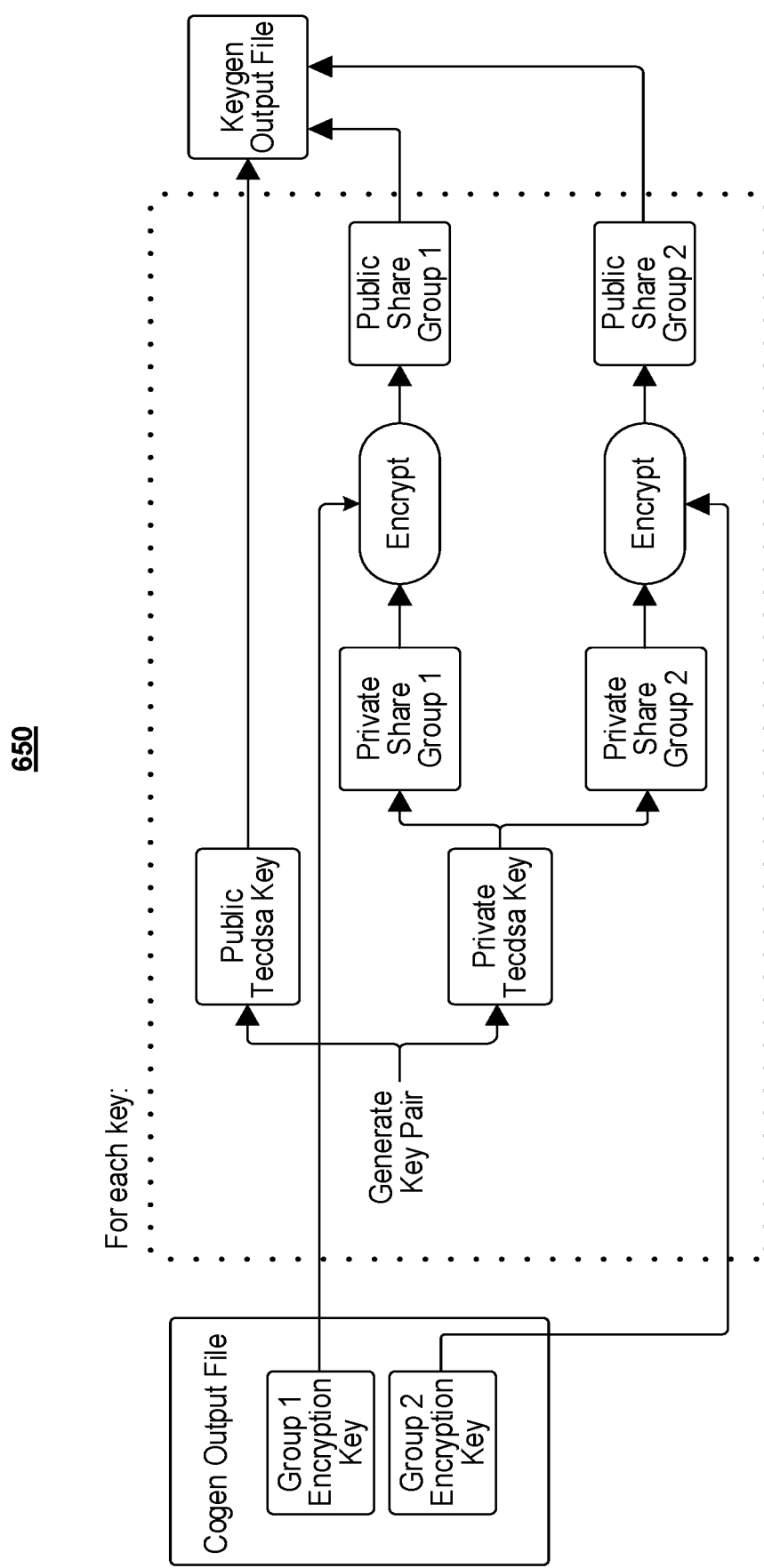

FIGS. 6A-C show illustrative diagrams for multi-party key creation for one or more cohorts. For example, the components shown in FIGS. 6A-C may be used to generate secure, encrypted communications across distributed computer networks for authorizing use of cryptography-based digital repositories in order to perform blockchain operations in decentralized applications.

For example, FIGS. 6A-C show illustrative diagrams for key creation in an MPC key system. As shown in FIG. 6A, diagram 600 illustrates the steps for each cosigner (e.g., user device or simply "user") when generating a private key share, which may in some embodiments comprise a partial private key share. For example, the system (e.g., a custodial platform for blockchain operations) may generate keys for an MPC key using a key generation ceremony (e.g., a keygen ceremony). To do this, the system may create a cohort of cosigners in a cohort generation ceremony (e.g., a cogen ceremony). In some embodiments, a user device may refer to a cosigner for signing blockchain operations. If the cosigner is a "human" cosigner (e.g., corresponding to a user device operated by a user as opposed to a custodial platform for blockchain operations), the cosigner may use a hardware solution (e.g., a hardware wallet) for protecting certificate authority root keys. The hardware wallet is a hardware solution (e.g., YubiHSM) for protecting certificate authority root keys from being copied by attackers, malware, and malicious insiders. If the cosigner is a server cosigner (e.g., corresponding to a user device operated by a custodial platform for blockchain operations), the cosigner may use a key management service (e.g., KMS).

For example, as shown in diagram 600, the system may generate a public and a private key pair for each cosigner (e.g., each user device). The key pairs may include a device encryption key pair and a device authentication key pair. The device encryption key pair may comprise a device encryption public key and a device encryption private key. The device encryption private key may be stored only on the user device (e.g., to enhance security, the device encryption private key does not leave the user device). The device encryption public key may then be used to generate a cogen input file (e.g., a cohort generation input file). The device encryption key pair may be used to generate encryption keys for digital signing policies. The key pairs may also include a device authentication key pair. The device authentication key pair may comprise a device authentication public key and a device authentication private key. The device authentication private key may be stored only on the user device (e.g., to enhance security, the device authentication private key does not leave the user device). The device authentication public key may then be used to generate a cogen input file (e.g., a cohort generation input file). The device authentication key pair may be used to generate authentication keys for device authentication. For example, the system may authenticate devices during key-signing ceremonies in order to provide enhanced security (e.g., responding to requests only from authenticated devices).

For example, in some embodiments, the system may generate, for a first user device of a plurality of user devices, a first cogen input file, wherein the first cogen input file is based on a public portion of a first device encryption key pair and a public portion of a first device authentication key pair. The system may then generate another cogen input file for another user device. For example, the system may generate, for a second user device of a plurality of user devices, a second cogen input file, wherein the second cogen input file is based on a public portion of a second device encryption key pair and a public portion of a second device authentication key pair. In such cases, the public keys may comprise non-sensitive data, whereas the private keys comprise sensitive data.

As shown in FIG. 6B, diagram 630 illustrates the steps for each cohort (e.g., a plurality of user devices) when generating a group key based on a cogen input file for various user devices in a cohort bloc. For example, a cohort bloc may comprise various user devices, each with respective partial private keys that nonetheless correspond to a single entity or user. As one example, a cohort bloc may include a first user device used for performing blockchain operations (e.g., contributing to a digital signing process) and a second user device used as a recovery key in case the first user device is lost. The second user device may have the same or different rights from the first. For example, the second user device may not have the credentials necessary to perform blockchain operations. In diagram 630, the cogen input files generated for respective devices in diagram 600 (referred to herein collectively as the cogen input file) are used to generate a cogen output file. The cogen output file is based on gathering encryption and authentication keys for cosigners who are part of the cohort.

As shown in FIG. 6B, diagram 630 illustrates a cogen ceremony for each cohort bloc (e.g., each group of user devices with a plurality of user devices within a cohort). For each cohort bloc, the system may generate a cohort generation output file (i.e., "cogen output file"). The cogen output file may comprise a bloc encryption key, a Paillier encryption key, a Paillier decryption key ciphertext, a bloc decryption key ciphertext, a public portion of the first device authentication key pair, and/or a public portion of the second device authentication key pair. For example, when generating the cogen output file, the system may determine a subset of the plurality of user devices for inclusion in a first cohort bloc, generate a bloc encryption key pair for the first cohort bloc, wherein the bloc encryption key pair for the first cohort bloc comprises a bloc encryption key and a bloc decryption key, and generate a Paillier encryption key pair for the first cohort bloc, wherein the Paillier encryption key pair for the first cohort bloc comprises a Paillier encryption key and a Paillier decryption key. In some embodiments, the system may use the bloc encryption key to encrypt the Paillier decryption key, and generate a Paillier decryption key ciphertext for inclusion in the first cogen output file. It should be noted that the system may use any asymmetric algorithm for public key cryptography.

It should further be noted that any asymmetric algorithm used for public key cryptography may be used for key generation, encryption, and/or decryption in various embodiments. For example, during key generation, the system may select two numbers (e.g., two large prime numbers p and q), which should be selected randomly and independently of each other such that gcd(pq, (p−1)(q−1))=1. The system may then compute n=pq and λ=1 cm(p−1, q−1), wherein the 1 cm comprises the least common multiple. The system may then select a random integer g and ensure that n divides the order of g using the modular multiplicative inverse, μ, based on:

$$g \in \mathbb{Z}_{n^2}^*$$

$$\mu = \left(L\!\left(g^\lambda \bmod n^2\right)\right)^{-1} \bmod n,$$

$$L(x) = \frac{x-1}{n}$$

The system may then determine the public encryption key (n, g) and the private decryption key (λ, μ). During encryption, the system may use message, m, select a random, r, and compute a ciphertext based on:

$$0 \le m < n$$

$$0 < r < n$$

$$c = g^m \cdot r^n \bmod n^2$$

During decryption, the system may have ciphertext, c, to decrypt and compute the plaintext message, m, based on:

$$c \in \mathbb{Z}_{n^2}^*$$

$$m = L(c^\lambda \bmod n^2) \cdot \mu \bmod n$$

For example, for each group or cohort bloc, the system may generate a group encryption key pair (or cohort bloc encryption key pair) and an asymmetric algorithm key pair (e.g., a Paillier encryption key pair). The group encryption key pair may comprise a group encryption key, which is included in the cogen output file, and a group decryption key, which is encrypted using the device encryption public key from the cogen input file to generate a group decryption key ciphertext. The system may generate one group decryption key ciphertext for each cosigner (e.g., for each user device). The asymmetric algorithm key pair (e.g., a Paillier encryption key pair) may comprise an asymmetric algorithm encryption key and an asymmetric algorithm decryption key. The asymmetric algorithm encryption key and the asymmetric algorithm decryption key may be encrypted to generate an asymmetric algorithm decryption key ciphertext.

The system may then generate a cogen output file that comprises a cohort bloc encryption key, an asymmetric algorithm encryption key, an asymmetric algorithm decryption key ciphertext, a cohort bloc decryption key ciphertext, a public portion of the first device authentication key pair, and/or a public portion of the second device authentication key pair. The cogen output file is then used as an input to encrypt the key materials that are generated in the keygen ceremony. For example, the system may generate a cohort key generation file, wherein the first cogen output file is used to encrypt the cohort key generation file.

As shown in FIG. 6C, diagram 650 illustrates a key generation (i.e., "keygen") ceremony for each key to generate a key generation output file (e.g., "keygen output file" or "cohort key gen file"). For example, the system may generate a cohort key generation file for each user device (e.g., corresponding to a respective cohort key for the MPC key system). The system may then transmit, to the user device, the cohort key generation file, wherein the cohort key generation file comprises a cohort public key for a digital signature algorithm and causes a first partial private key for the digital signature algorithm to be generated on the user device.

During the keygen ceremony, the cogen output file is used to generate a keygen output file. For example, for each key, the system may generate a key generation pair. The key generation pair may comprise a public digital signature algorithm key and a private digital signature algorithm key. In some embodiments, the public digital signature algorithm key and the private digital signature algorithm key may comprise an Elliptic Curve Digital Signature Algorithm (ECDSA) and/or may use a threshold signing policy. For example, the system may generate an MPC key system in which a threshold number of key shares are required to perform a blockchain operation.

The public digital signature algorithm key may then be included in the keygen output file. In contrast, the private digital signature algorithm key is used to create a private share for each cohort bloc. For example, the system may create a private share for each group of user devices that comprise a cohort bloc. The system may then use a respective cohort bloc encryption key for a given cohort bloc to encrypt the private share for a corresponding group. The encrypted private share is then used for a corresponding public share and provided in the keygen output file. As such, the keygen output file contains the materials (e.g., the instructions for generating private and/or partial private key shares on a user device) which will be used by cosigners (e.g., user devices) to sign messages (e.g., signing requests for performing blockchain operations) received by the system (e.g., a system coordinator).

Figure 7:
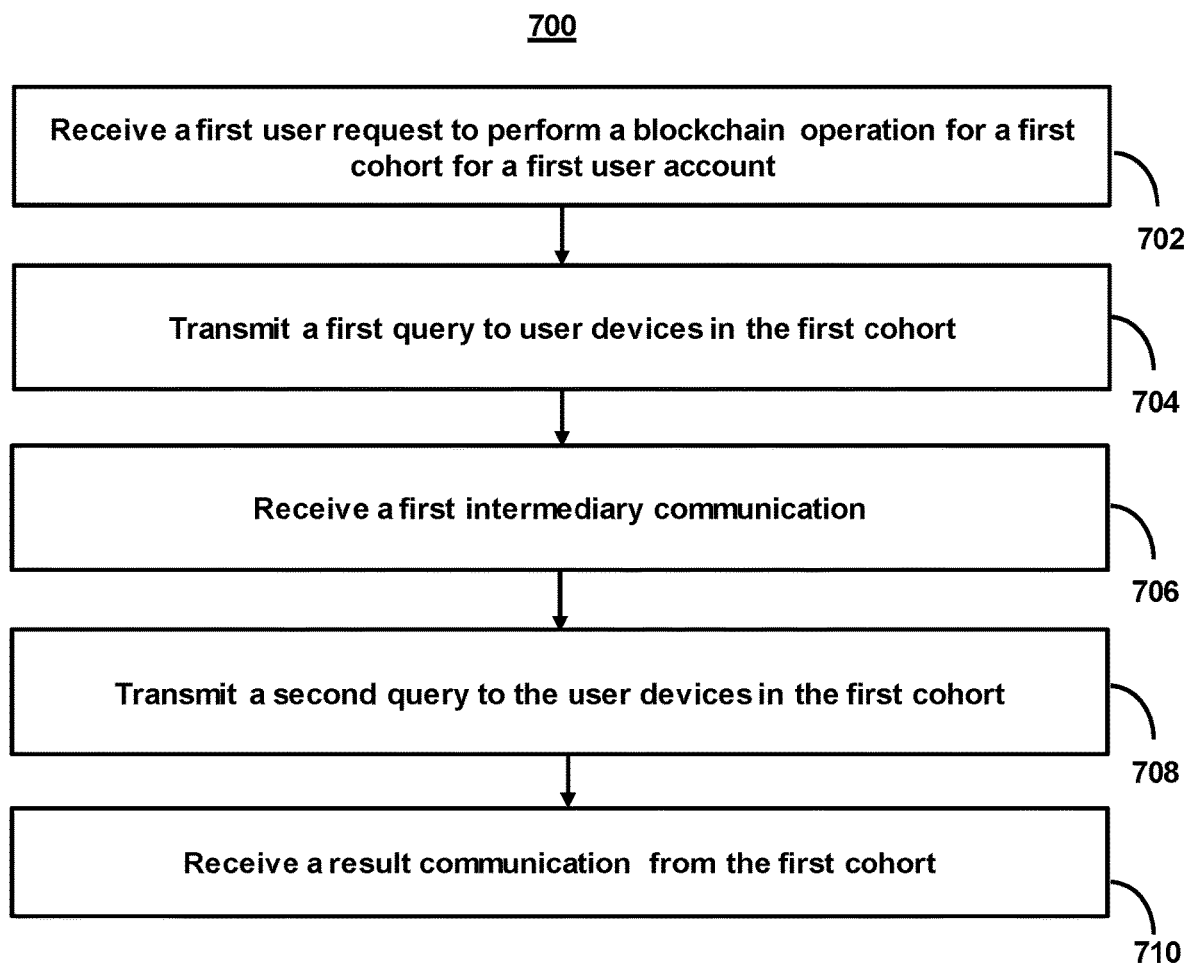
FIG. 7 shows a flowchart of the steps involved in transmitting secure, encrypted communications across distributed computer networks using MPC for authorizing use of cryptography-based digital repositories in order to perform blockchain operations in decentralized applications, in accordance with one or more embodiments.

FIG. 7 shows a flowchart of the steps involved in transmitting secure, encrypted communications across distributed computer networks using MPC for authorizing use of cryptography-based digital repositories in order to perform blockchain operations in decentralized applications, in accordance with one or more embodiments. For example, the system may use process 700 (e.g., as implemented on one or more system components described above) in order to allow a user to conduct blockchain operations in a secure manner with third-party decentralized applications.

At step 702, process 700 (e.g., using one or more components described above) may receive a first user request to perform a blockchain operation for a first cohort for a first user account. For example, the system may receive, at a remote coordination server from a first user device, a first user request to perform a blockchain operation for a first cohort for a first user account, wherein the first cohort includes a plurality of user devices authorized to contribute to a first tier of a digital signing ceremony featuring an MPC signing procedure for conducting blockchain operations corresponding to a cryptography-based storage application for the first user account, wherein the first tier of the digital signing ceremony is conducted between the plurality of user devices. For example, performing the blockchain operation may comprise generating a digital signature by completing the digital signing ceremony using a first partial private key corresponding to the remote coordination server and a second partial private key corresponding to the second user device.

At step 704, process 700 (e.g., using one or more components described above) may transmit a first query to user devices in the first cohort. For example, the system may, in response to receiving the first user request, transmit a first query to one or more of the plurality of user devices. In some embodiments, each of the plurality of user devices may have a respective partial private key for performing the blockchain operation for the first cohort for the first user account, and wherein each respective partial private key is equivalent for signature computation purposes.

At step 706, process 700 (e.g., using one or more components described above) may receive a first intermediary communication. For example, the system may, in response to the first query, receive, at the remote coordination server from the first user device of the plurality of user devices, a first intermediary communication, wherein the first intermediary communication is one of a first plurality of intermediary communications that comprise the digital signing ceremony, and wherein each of the first plurality of intermediary communications comprises end-to-end encryption to prevent the remote coordination server from accessing a respective message in each of the first plurality of intermediary communications.

At step 708, process 700 (e.g., using one or more components described above) may transmit a second query to the user devices in the first cohort. For example, the system may, in response to receiving the first intermediary communication, transmit a second query to one or more of the plurality of user devices.

At step 710, process 700 (e.g., using one or more components described above) may receive a result communication from the first cohort. For example, the system may receive, at the remote coordination server, a result communication from a second user device of the plurality of user devices, wherein the result communication does not comprise the end-to-end encryption, and wherein the result communication indicates a completion of the first tier of the digital signing ceremony, and wherein the result communication indicates that a signing policy for the first tier of the digital signing ceremony has been met. For example, the result communication may indicate that a minimum number of approvals from the plurality of user devices has been received and/or the result communication may comprise an endorsement, by the first user device, of the blockchain operation. In some embodiments, in response to receiving the result communication, the system may perform a second tier of the digital signing ceremony, wherein the second tier of the digital signing ceremony is conducted at least in part between the remote coordination server and the second user device. In response to performing the second tier of the digital signing ceremony, the system may perform the blockchain operation for the first cohort for the first user account.

In some embodiments, the system may trigger a second tier of a digital signing ceremony based on the result communication. Furthermore, the second tier of the digital signing ceremony comprises a synchronous two-of-two signing protocol. For example, the system may, in response to receiving the result communication, perform a second tier of the digital signing ceremony, wherein the second tier of the digital signing ceremony is conducted between the remote coordination server and the second user device. The system may, in response to performing the second tier of the digital signing ceremony, perform the blockchain operation for the first cohort for the first user account.

In some embodiments, the second tier of the digital signing ceremony may comprise one or more communications. For example, the system may retrieve, at the remote coordination server, a second partial private key. The system may generate a partial digital signature by contributing to the digital signing ceremony using the second partial private key. The system may transmit the partial digital signature to the second user device.

In some embodiments, the receipt of the result communication may cause the system to invoke a secure broadcast channel. For example, in response to determining that the first tier of the digital signing procedure has been completed (based on one or more of the user devices enforcing the signing policy), the remote coordination server (e.g., the coordinator) may complete the blockchain operation over a secure broadcast channel. For example, in response to receiving the result communication, the system may initiate a secure broadcast channel between the remote coordination server and the second user device. The system may transmit a second intermediary communication, wherein the second intermediary communication is one of a second plurality of intermediary communications between the remote coordination server and the second user device.

In some embodiments, each of the second plurality of intermediary communications may comprise end-to-end encryption to prevent the first user device from accessing a respective message in each of the second plurality of intermediary communications. For example, during the second tier of the digital signing ceremony, the remote coordination server (e.g., the coordinator) may communicate with the second user device using the secure broadcast channel and/or end-to-end encryption that prevents the user devices in the first cohort (as well as other user devices) from accessing and/or intercepting the communications.

It is contemplated that the steps or descriptions of FIG. 7 may be used with any other embodiment of this disclosure. In addition, the steps and descriptions described in relation to FIG. 7 may be done in alternative orders or in parallel to further the purposes of this disclosure. For example, each of these steps may be performed in any order, in parallel, or simultaneously to reduce lag or increase the speed of the system or method. Furthermore, it should be noted that any of the components, devices, or equipment discussed in relation to the figures above could be used to perform one or more of the steps in FIG. 7.

Figure 8:
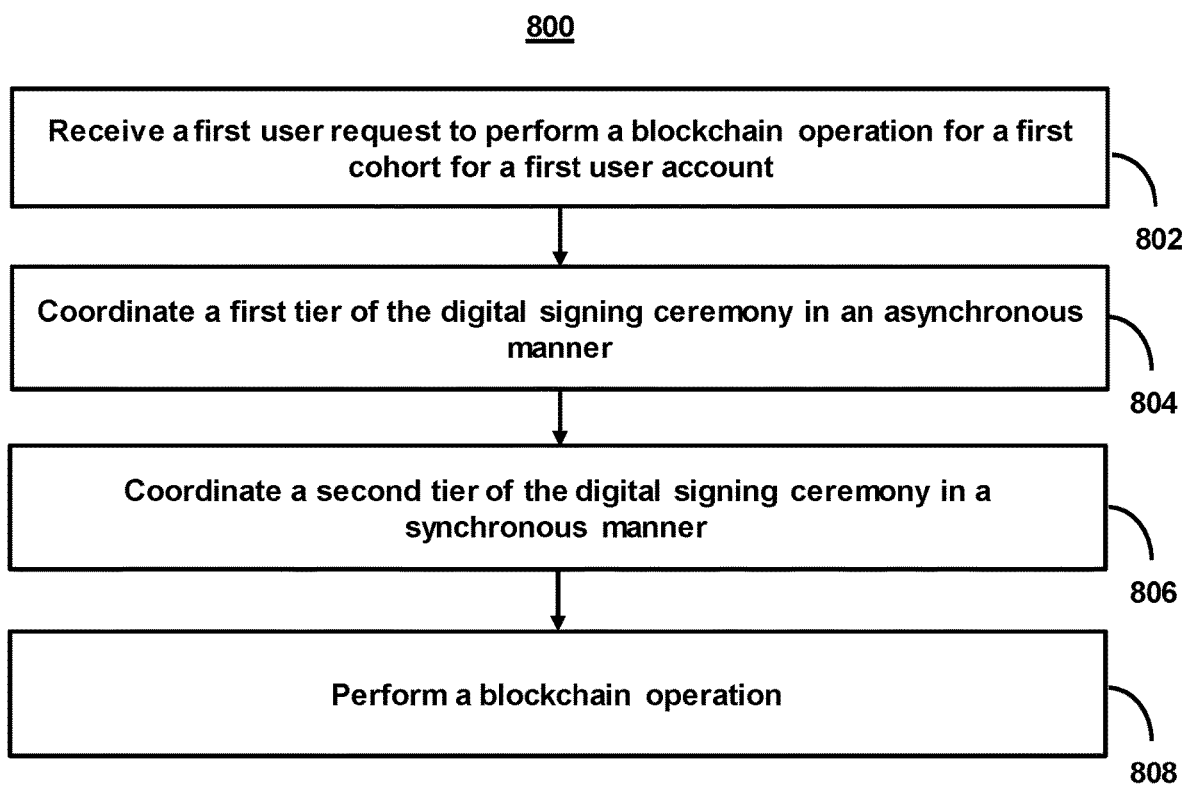
FIG. 8 shows a flowchart of the steps involved in performing a two-tiered MPC signing procedure for authorizing use of cryptography-based digital repositories in order to perform blockchain operations in decentralized applications, in accordance with one or more embodiments.

FIG. 8 shows a flowchart of the steps involved in performing a two-tiered MPC signing procedure for authorizing use of cryptography-based digital repositories in order to perform blockchain operations in decentralized applications, in accordance with one or more embodiments. For example, the system may use process 800 (e.g., as implemented on one or more system components described above) in order to allow a user to conduct blockchain operations in a secure manner with third-party decentralized applications.

At step 802, process 800 (e.g., using one or more components described above) may receive a first user request to perform a blockchain operation for a first cohort for a first user account. For example, the system may receive, at a remote coordination server from a first user device, a first user request to perform a blockchain operation for a first cohort for a first user account, wherein the first cohort includes a plurality of user devices authorized to contribute to a first tier of a digital signing ceremony featuring an MPC signing procedure for conducting blockchain operations corresponding to the cryptography-based storage application for the first user account, wherein the first tier of the digital signing ceremony is conducted between the plurality of user devices. For example, each of the plurality of user devices may have a respective partial private key for performing the blockchain operation for the first cohort for the first user account, and wherein each respective partial private key is equivalent for signature computation purposes.

At step 804, process 800 (e.g., using one or more components described above) may coordinate a first tier of the digital signing ceremony in an asynchronous manner. For example, the system may coordinate the first tier of the digital signing ceremony in an asynchronous manner by: transmitting, at a first time, a first request for a first communication to the first user device of the plurality of user devices; receiving, at a second time, the first communication from the first user device; and determining whether a difference between the first time and the second time does not exceed a first time threshold. For example, the first communication may comprise end-to-end encryption to prevent the remote coordination server from accessing a message in the first communication. In some embodiments, the first communication may comprise a result communication. For example, the first communication may indicate that a minimum number of approvals from the plurality of user devices has been received and/or the first communication may comprise an endorsement, by the first user device, of the blockchain operation.

In some embodiments, the first tier may include additional communications corresponding to rounds of a signing procedure. For example, coordinating the first tier of the digital signing ceremony in the asynchronous manner further comprises: transmitting additional requests for additional communications to the plurality of user devices; and determining whether the additional communications were received from the plurality of user devices within the first time threshold. In some embodiments, the platform may retrieve a signing policy for the cohort. For example, the system may retrieve a signing policy for the first cohort. The system may then determine the first time threshold based on the signing policy.

At step 806, process 800 (e.g., using one or more components described above) may coordinate a second tier of the digital signing ceremony in a synchronous manner. For example, the system may, in response to determining that the difference between the first time and the second time does not exceed the first time threshold, coordinate a second tier of the digital signing ceremony in a synchronous manner by: transmitting, at a third time, a third request for a third communication to a second user device of the plurality of user devices; receiving, at a fourth time, the third communication from the second user device; and determining whether a difference between the third time and the fourth time does not exceed a second time threshold.

In some embodiments, the second tier may comprise a portion of a digital signing ceremony (e.g., a digital signing ceremony comprising a synchronous two-of-two signing protocol). For example, the system may perform the second tier of the digital signing ceremony by: retrieving, at the remote coordination server, a second partial private key; generating a partial digital signature by contributing to the digital signing ceremony using the second partial private key; and transmitting the partial digital signature to the second user device.

For example, transmitting the third request for the third communication to the second user device of the plurality of user devices may comprise: generating a continuous stream data signal for transmitting the third request; and generating a timing signal for accompanying the continuous stream data signal.

At step 808, process 800 (e.g., using one or more components described above) may perform a blockchain operation. For example, the system may, in response to determining that the difference between the third time and the fourth time does not exceed the second time threshold, perform a blockchain operation.

For example, a cohort configuration protocol may indicate various rules and policies for a cohort. These polices may include update, approval, and/or signing policies, but also other rules. For example, a rule may include a configuration revision rule that comprises a monotonically increasing number that identifies when one policy supersedes another. The rules may also distinguish between trusted and untrusted devices and/or arrangements and apply different procedures accordingly. For example, a trusted (that is, local-to-the-cosigner or public-and-indelible) revision is required to prevent rollback attacks, presenting a previously valid configuration that has since been superseded.

The cohort configuration protocol may be stored on each user device in the cohort. For example, the user devices (e.g., cosigners) may be able to store cohort identifiers and revisions alongside device keys. In some examples, revision storage may be independent of services that publish configurations (including enrollment service or signing service) to prevent malicious server attacks.

When a device is initially enrolled in a cohort (including cohort formation), the device operator may independently verify the configuration policy. In some embodiments, device operators can physically co-locate in a conference room and inspect each other's devices and compare device-reported information. Alternatively, device operators can post their own information via screencap or re-type to a Slack channel or Jira ticket, or call and verify peer information.

Once enrolled, the device signs the configuration policy with its own signing key and escrows the approval signature with the device enrollment service. Additionally or alternatively, the device may cache the policy locally for performance. By storing this information, the system may perform numerous functions such as auditing, forensics, and/or maintenance operations. For example, if the device's local state is corrupted or destroyed (e.g., if an app is deleted and reinstalled), but the device keys remain sound, the device can download the configuration and its own approval and re-enter service without repeating the bootstrap phase.

The system may also maintain separate signing and update policies. For example, the update (or approval) policy may be independent from the signing policy and/or may have different rules. For instance, the system may require only 3 of 10 user devices to approve a blockchain operation (e.g., a transaction), but the system may require 6 of 10 user devices to reduce the number of approvers. By doing so, the system provides flexibility. This level of built-in flexibility (e.g., changing policies) is valuable as the value of assets protected changes, the number of cosigners changes, and/or changes occur in the speed at which operations are conducted (e.g., in contrast to conventional systems). This also allows for cohort policies to be updated in an online manner with the only offline work as verifications and still operate in an untrusted server model. For example, an update policy may specify the minimum requirements that must be satisfied before any user device (e.g., cosigner) will accept an updated policy revision.

In some embodiments, the first cohort configuration protocol may further comprise a signing policy. The signing policy may indicate a threshold signing metric for authorizing the digital signing process.

For example, in contrast to conventional systems, the cohort configuration protocol may indicate a signing policy that is distinct (e.g., has different requirements and rules) from the update policy. For example, the signing policy may indicate one or more rules or protocols for generating a digital signature, such as which mathematical technique is used to validate the authenticity and integrity of a message, what software is used, or what types of digital documents (or blockchain operations) may be signed for. The update policy may indicate the rules and/or procedures for adding and/or removing user devices from a cohort.

In some embodiments, a signing policy may specify the minimum requirements that must be satisfied before any user device (e.g., cosigner) will participate in signature production. For example, the system may need to specify the minimum number of human cosigners that must approve a transaction prior to signing. This number may include both user device cosigners (e.g., humans) and server-based cosigners that will verify human cosigner approvals prior to signature production.

In some embodiments, updating the cohort composition based on comparing the response set to the update policy may further comprise comparing a number of approvals. For instance, in some embodiments, the threshold approval metric may correspond to a minimum number of approvals required to be received from different user devices of the plurality of user devices to authorize the update. In other embodiments, the threshold approval metric may correspond to a minimum number of approvals required to be received from a single user device of the plurality of user device to authorize the update. As an example, the system may determine a number of approvals in the response set. The system may then compare the number of approvals to the minimum number of approvals.

For example, the system may poll the numerous devices in a cohort and require a minimum number of different devices in the cohort to approve of the update. As another example, the system may poll a single device in a cohort and require a minimum number of approvals to come from a single device. In some embodiments, the system may apply additional criteria such as requiring the approvals to come within a given time period and/or at a given frequency. In some embodiments, updating the cohort composition based on comparing the response set to the update policy may further comprise comparing a percentage of approvals. For instance, in some embodiments, the threshold approval metric may correspond to a minimum percentage of approvals required to be received from the plurality of user devices to authorize the update. For example, the system may determine a percentage of approvals in the response set. The system may then compare the percentage of approvals to the minimum percentage of approvals.

In some embodiments, updating the cohort composition based on comparing the response set to the update policy may further comprise comparing time periods. For instance, in some embodiments, the threshold approval metric may correspond to a maximum time period within which an approval is received from at least one of the plurality of user devices to authorize the update. For example, the system may determine a time period corresponding to the response set. The system may then compare the time period to the maximum time period.

In some embodiments, updating the cohort composition based on comparing the response set to the update policy may further comprise comparing frequencies. For instance, in some embodiments, the threshold approval metric may correspond to a minimum frequency for updates to the cohort composition. For example, the system may determine a current frequency for updates to the cohort composition. The system may then compare the minimum frequency to the current frequency.

In some embodiments, updating the cohort composition based on comparing the response set to the update policy may further comprise comparing wait times. For instance, in some embodiments, the threshold approval metric may correspond to a minimum wait time for updating the signing policy following the cohort update. For example, the system may determine a current wait time for updating the signing policy following the cohort update. The system may then compare the minimum wait time to the current wait time.

In some embodiments, updating the cohort composition based on comparing the response set to the update policy may further comprise determining an amount of digital assets. For instance, in some embodiments, the threshold approval metric may be based on an amount of digital assets in the first cryptography-based storage application. For example, the system may determine a current amount of digital assets in the first cryptography-based storage application. The system may then compare the current amount of digital assets to the threshold approval metric.

In some embodiments, updating the cohort composition based on comparing the response set to the update policy may further comprise determining a current network-imposed processing load. For instance, in some embodiments, the threshold approval metric may be based on a respective network-imposed processing load for a call operation to a blockchain node. For example, the system may determine a current network-imposed processing load for the call operation to the blockchain node. The system may then compare the current network-imposed processing load to the threshold approval metric.

In some embodiments, the update may comprise altering the cohort. For example, the update may comprise adding a new user device to the first cohort, removing a current user device of the plurality of user devices from the first cohort, or substituting the current user device of the plurality of user devices from the first cohort with the new user device.

It is contemplated that the steps or descriptions of FIG. 8 may be used with any other embodiment of this disclosure. In addition, the steps and descriptions described in relation to FIG. 8 may be done in alternative orders or in parallel to further the purposes of this disclosure. For example, each of these steps may be performed in any order, in parallel, or simultaneously to reduce lag or increase the speed of the system or method. Furthermore, it should be noted that any of the components, devices, or equipment discussed in relation to the figures above could be used to perform one or more of the steps in FIG. 8.

Figure 9:
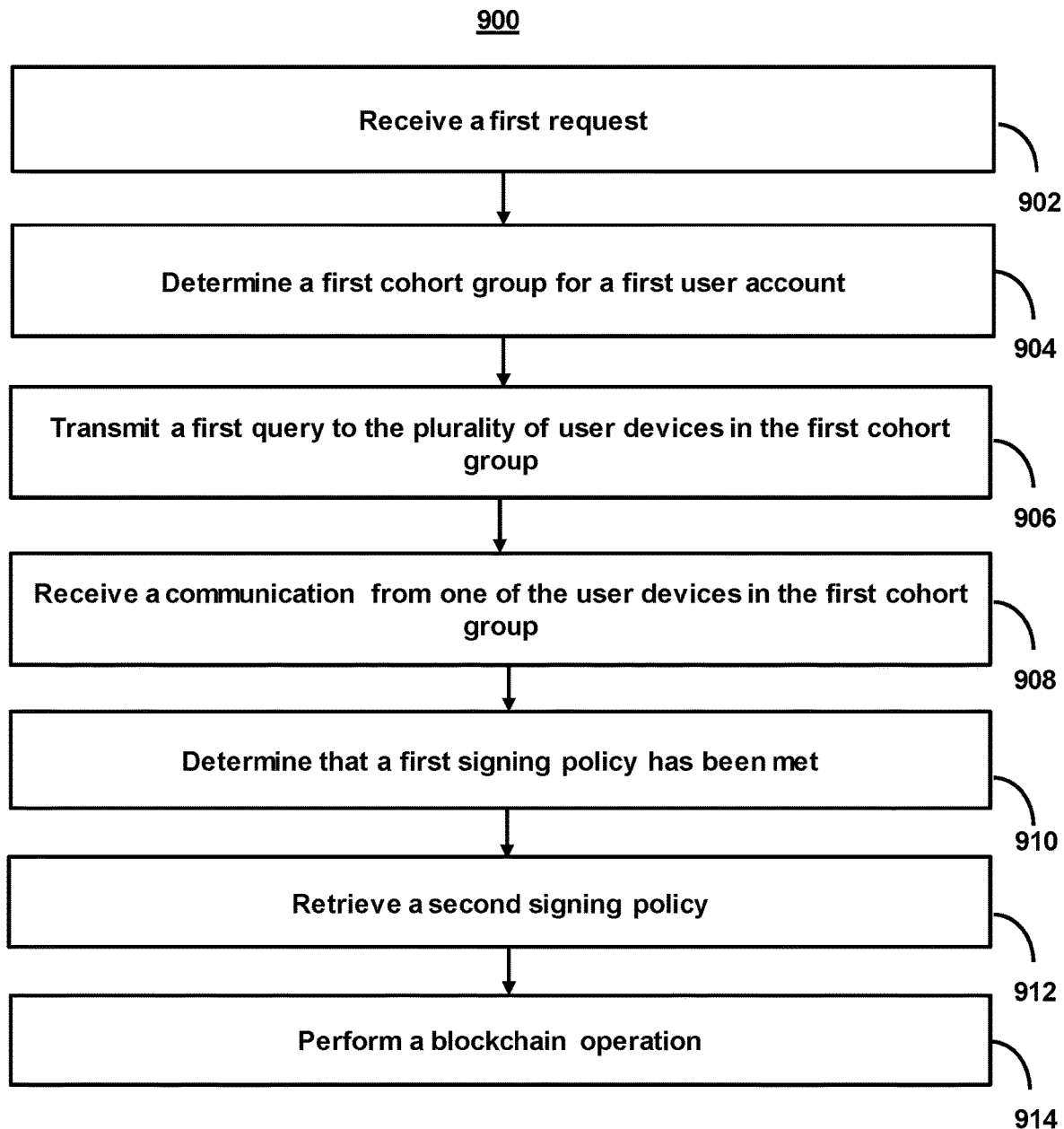
FIG. 9 shows a flowchart of the steps involved in performing blockchain operations across distributed computer networks using cohort management groupings for multi-party computations, in accordance with one or more embodiments.

FIG. 9 shows a flowchart of the steps involved in performing blockchain operations across distributed computer networks using cohort management groupings for multi-party computations, in accordance with one or more embodiments. For example, the system may use process 900 (e.g., as implemented on one or more system components described above) in order to allow a user to conduct blockchain operations in a secure manner with third-party decentralized applications.

In some embodiments, the system may comprise a cryptography-based storage application. The cryptography-based storage application may correspond to a plurality of partial private keys. The system may also comprise a plurality of user devices, where each of the user devices corresponds to one of the plurality of partial private keys. The system may also comprise a remote server configured to effectuate one or more operations as described below.

At step 902, process 900 (e.g., using one or more components described above) may receive a first user request. For example, the system may receive a first request. The system may receive, at a remote coordination server, a first user request to perform a blockchain operation with a first user account.

As another example, the system may use a user account that corresponds to an account for the blockchain platform service. For example, as opposed to a non-custodial cryptography-based storage application, which may correspond to a user without a third-party intermediary, the user account may correspond to a third-party intermediary (e.g., the platform service). By having a user account that corresponds to the platform service that is separate and distinct from a non-custodial cryptography-based storage application, the system may provide additional features that would not be possible with conventional blockchain operations. For example, the system may augment and/or modify blockchain operations prior to completion in order to prevent fraud, verify user intent, and/or otherwise increase security.

Additionally or alternatively, by having a user account that corresponds to the platform service that is separate and distinct from a non-custodial cryptography-based storage application, the system may provide a single user to access multiple custodial cryptography-based storage applications using a single account for the platform service. In some embodiments, the first user account may correspond to a blockchain or user address. For example, a user address may correspond to a non-custodial cryptography-based storage application assigned by a blockchain. The non-custodial wallet may correspond to a private and/or public key that allows blockchain operations to be performed using funds and/or information in the non-custodial wallet.

As another example, with respect to the digital signing process, the system may query the first user device for use of its partial private key. For example, in order to maintain security, neither the first user device nor the first remote device may share their respective partial private keys. However, both devices may still be required to use their partial private keys in order to perform the blockchain operation. To accomplish this, the system may use a Schnorr signature algorithm, ECDSA, Digital Signature Algorithm (DSA), and/or other suitable algorithm. For example, the key-signing session may involve the setting of one or more parameters as well as a hash function.

For example, in one embodiment, a threshold signature scheme may generate both a secret key, s, during key generation as well as the random nonce, k, for each signing operation. In such cases, a key-signing session may require a minimum of four rounds for each signing operation (e.g., assuming no round results in an error). For example, the system may use three rounds to obtain k, and the system may use one round to distribute signature shares and compute the group signature.

For example, the key-signing session may involve the setting of one or more parameters as well as a hash function. The system may also select a nonce value. The nonce may be an arbitrary number that can be used once in a cryptographic communication. The system may determine the nonce to be a random or pseudo-random number. The nonce value may be selected by the system based on an authentication protocol to ensure that previous blockchain operations (and/or communications containing them) cannot be reused. The system may also use the nonce value to initialize vectors for a hash function. For example, the system may select a nonce value to adjust the level of difficulty (e.g., the amount of work required) in a proof-of-work system.

As yet another example, cryptography-based digital repositories or a cryptography-based storage application may refer to a digital wallet. A digital wallet may comprise a software-based system that securely (and typically in an encrypted format) stores users, confidential information, personal information, payment information, and/or passwords for numerous payment methods and websites. By using a digital wallet, users can complete communications, purchases, and/or other blockchain operations easily and securely without risking the information becoming public or subject to a cyberattack.

In some embodiments, the digital signing process may be selected. For example, the system may determine a characteristic of the first user device. The system may then select the digital signing process based on the characteristic. For instance, the system may select a digital signing process based on the processing power and/or geographic location of the first user device. For example, some devices may suffer from low processing power and/or low connectivity. As such, the system may determine a characteristic of a user device and select a signature scheme based on the characteristic. For example, the system may select a Flexible Round-Optimized Schnorr Threshold Signatures (FROST) protocol, which may use a two-round Distributed Key Generation (DKG) protocol to generate the nonce required for the signature.

At step 904, process 900 (e.g., using one or more components described above) may determine a first cohort group for a first user account. For example, the system may, in response to receiving the first user request, determine, at the remote coordination server, a first cohort group for the first user account, wherein the first cohort group comprises a plurality of user devices authorized to contribute to a digital signing ceremony featuring a multi-party computation (MPC) signing procedure for conducting a plurality of blockchain operations corresponding to a cryptography-based storage application for the first user account, and wherein the first cohort group comprises a first signing policy.

At step 906, process 900 (e.g., using one or more components described above) may transmit a first query to the plurality of user devices in the first cohort group. For example, the system may transmit, at the remote coordination server, a first query to the plurality of user devices in the first cohort group.

At step 908, process 900 (e.g., using one or more components described above) may receive a communication from one of the user devices in the first cohort group. For example, the system may receive, at the remote coordination server, a communication from one or more of the user devices in the plurality of user devices. In some embodiments, the system may, in response to the first query, receive, at the remote coordination server from a first user device of the plurality of user devices, a first intermediary communication, wherein the first intermediary communication is one of a first plurality of intermediary communications that comprise the digital signing ceremony, and wherein each of the first plurality of intermediary communications comprises end-to-end encryption to prevent the remote coordination server from accessing a respective message in each of the first plurality of intermediary communications. The system may, in response to receiving the first intermediary communication, transmit a second query to one or more of the plurality of user devices.

At step 910, process 900 (e.g., using one or more components described above) may determine that a first signing policy has been met. For example, the system may determine that the communication indicates that the first signing policy has been met (e.g., determine that a minimum number of approvals from the plurality of user devices has been received). In some embodiments, the first signing policy may use asynchronous transmissions, whereas a second signing policy uses synchronous transmissions.

For example, determining that the communication indicates that the first signing policy has been met may comprise: determining a first time at which the first query was sent; determining a current time; determining a difference between the first time and the current time; and determining whether the difference meets a threshold time difference, wherein the threshold time difference is based on the first signing policy.

At step 912, process 900 (e.g., using one or more components described above) retrieves a second signing policy. For example, the system may enforce different signing policies on the different tiers of the MPC signing procedure. In some embodiments, the system may determine a second cohort group for the first user account. For example, the system may determine a second cohort group for the first user account, wherein the second cohort group comprises a second signing policy. In some embodiments, determining the second cohort group for the first user account may comprise determining a user device that transmitted the communication, and, in response to determining that the user device transmitted the communication, adding the user device to the second cohort group. For example, the system may determine the user device that indicates that the initial signing policy has been met, and include that user device in the second cohort group. By doing so, the system ensures that the user device needed for the two-of-two approval is available. Additionally, by dynamically determining the second cohort group, the system may maintain flexibility as to what device is used for the two-of-two approval.

In some embodiments, the system may perform additional actions based on the first signing policy met. For example, in response to receiving the communication, the system may initiate a secure broadcast channel between the remote coordination server and a user device in the second cohort group. The system may transmit an additional communication, using the secure broadcast channel, to meet the second signing policy between the remote coordination server and the user device. The additional communication may comprise end-to-end encryption to prevent the user device from accessing a respective message in the additional communication.

At step 914, process 900 (e.g., using one or more components described above) may perform a blockchain operation. For example, the system may perform the blockchain operation in response to the second signing policy (e.g., a synchronous two-of-two signing protocol) having been met. In some embodiments, performing the blockchain operation may comprise: retrieving, at the remote coordination server, a second partial private key; generating a partial digital signature by contributing to the digital signing ceremony using the second partial private key; and transmitting the partial digital signature to a user device in the second cohort group.

It is contemplated that the steps or descriptions of FIG. 9 may be used with any other embodiment of this disclosure. In addition, the steps and descriptions described in relation to FIG. 9 may be done in alternative orders or in parallel to further the purposes of this disclosure. For example, each of these steps may be performed in any order, in parallel, or simultaneously to reduce lag or increase the speed of the system or method. Furthermore, it should be noted that any of the components, devices, or equipment discussed in relation to the figures above could be used to perform one or more of the steps in FIG. 9.

The above-described embodiments of the present disclosure are presented for purposes of illustration and not of limitation, and the present disclosure is limited only by the claims which follow. Furthermore, it should be noted that the features and limitations described in any one embodiment may be applied to any embodiment herein, and flowcharts or examples relating to one embodiment may be combined with any other embodiment in a suitable manner, done in different orders, or done in parallel. In addition, the systems and methods described herein may be performed in real time. It should also be noted that the systems and/or methods described above may be applied to, or used in accordance with, other systems and/or methods.

The present techniques will be better understood with reference to the following enumerated embodiments:

1. A method, the method comprising: receiving, at a remote coordination server from a first user device, a first user request to perform a blockchain operation for a first cohort for a first user account, wherein the first cohort includes a plurality of user devices authorized to contribute to a first tier of a digital signing ceremony featuring an MPC signing procedure for conducting blockchain operations corresponding to a cryptography-based storage application for the first user account, wherein the first tier of the digital signing ceremony is conducted between the plurality of user devices; in response to receiving the first user request, transmitting a first query to one or more of the plurality of user devices; in response to the first query, receiving, at the remote coordination server from the first user device of the plurality of user devices, a first intermediary communication, wherein the first intermediary communication is one of a first plurality of intermediary communications that comprise the digital signing ceremony, and wherein the remote coordination server does not have access to a respective message in each of the first plurality of intermediary communications; in response to receiving the first intermediary communication, transmitting a second query to one or more of the plurality of user devices; and receiving, at the remote coordination server, a result communication from a second user device of the plurality of user devices, wherein the result communication indicates a completion of the first tier of the digital signing ceremony, and wherein the result communication indicates that a signing policy for the first tier of the digital signing ceremony has been met.
2. The method of the preceding embodiment, wherein the method is for transmitting secure, encrypted communications across distributed computer networks using multi-party computations (MPC) for authorizing use of cryptography-based digital repositories in order to perform blockchain operations in decentralized applications.
3. The method of any one of the preceding embodiments, further comprising: in response to receiving the result communication, performing a second tier of the digital signing ceremony, wherein the second tier of the digital signing ceremony is conducted between the remote coordination server and the second user device; and in response to performing the second tier of the digital signing ceremony, performing the blockchain operation for the first cohort for the first user account.
4. The method of any one of the preceding embodiments, wherein the second tier of the digital signing ceremony comprises a synchronous two-of-two signing protocol.
5. The method of any one of the preceding embodiments, wherein performing the blockchain operation further comprises generating a digital signature by completing the digital signing ceremony using a first partial private key corresponding to an always-on server and a second partial private key corresponding to the second user device.
6. The method of any one of the preceding embodiments, wherein performing the second tier of the digital signing ceremony further comprises: retrieving, at the remote coordination server, a second partial private key; generating a partial digital signature by contributing to the digital signing ceremony using the second partial private key; and transmitting the partial digital signature to the second user device.
7. The method of any one of the preceding embodiments, wherein each of the plurality of user devices has a respective partial private key for performing the blockchain operation for the first cohort for the first user account, and wherein each respective partial private key is equivalent for signature computation purposes.
8. The method of any one of the preceding embodiments, further comprising: in response to receiving the result communication, initiating a secure broadcast channel between the remote coordination server and the second user device; and transmitting a second intermediary communication, wherein the second intermediary communication is one of a second plurality of intermediary communications between the remote coordination server and the second user device.
9. The method of any one of the preceding embodiments, wherein each of the second plurality of intermediary communications comprises end-to-end encryption to prevent the first user device from accessing a respective message in each of the second plurality of intermediary communications.
10. The method of any one of the preceding embodiments, wherein the result communication indicates that a minimum number of approvals from the plurality of user devices has been received.
11. The method of any one of the preceding embodiments, wherein the result communication comprises endorsement, by the first user device, of the blockchain operation.
12. A method, the method comprising: receiving, at a remote coordination server from a first user device, a first user request to perform a blockchain operation for a first cohort for a first user account, wherein the first cohort includes a plurality of user devices authorized to contribute to a first tier of a digital signing ceremony featuring an MPC signing procedure for conducting blockchain operations corresponding to the cryptography-based storage application for the first user account, wherein the first tier of the digital signing ceremony is conducted between the plurality of user devices; coordinating the first tier of the digital signing ceremony in an asynchronous manner by: transmitting, at a first time, a first request for a first communication to the first user device of the plurality of user devices; receiving, at a second time, the first communication from the first user device; and determining whether a difference between the first time and the second time does not exceed a first time threshold; in response to determining that the difference between the first time and the second time does not exceed the first time threshold, coordinating a second tier of the digital signing ceremony in a synchronous manner by: transmitting, at a third time, a third request for a third communication to a second user device of the plurality of user devices; receiving, at a fourth time, the third communication from the second user device; and determining whether a difference between the third time and the fourth time does not exceed a second time threshold; in response to determining that the difference between the third time and the fourth time does not exceed the second time threshold, performing a blockchain operation.
13. The method of any one of the preceding embodiments, wherein coordinating the first tier of the digital signing ceremony in the asynchronous manner further comprises: transmitting additional requests for additional communications to the plurality of user devices; and determining whether the additional communications were received from the plurality of user devices within the first time threshold.

14. The method of any one of the preceding embodiments, wherein transmitting the third request for the third communication to the second user device of the plurality of user devices further comprises: generating a continuous stream data signal for transmitting the third request; and generating a timing signal for accompanying the continuous stream data signal.
15. The method of any one of the preceding embodiments, further comprising: retrieving a signing policy for the first cohort; and determining the first time threshold based on the signing policy.
16. The method of any one of the preceding embodiments, wherein performing the second tier of the digital signing ceremony further comprises: retrieving, at an always-on server, a second partial private key; generating a partial digital signature by contributing to the digital signing ceremony using the second partial private key; and transmitting the partial digital signature to the second user device.
17. The method of any one of the preceding embodiments, wherein the first communication comprises end-to-end encryption to prevent the remote coordination server from accessing a message in the first communication.
18. The method of any one of the preceding embodiments, wherein the first communication indicates that a minimum number of approvals from the plurality of user devices has been received.
19. The method of any one of the preceding embodiments, wherein the first communication comprises endorsement, by the first user device, of the blockchain operation.
20. The method of any one of the preceding embodiments, wherein the second tier of the digital signing ceremony comprises a synchronous two-of-two signing protocol.
21. The method of any one of the preceding embodiments, wherein each of the plurality of user devices has a respective partial private key for performing the blockchain operation for the first cohort for the first user account, and wherein each respective partial private key is equivalent for signature computation purposes.
22. A method, the method comprising: receiving, at a remote coordination server, a first user request to perform a blockchain operation with a first user account; in response to receiving the first user request, determining, at the remote coordination server, a first cohort group for the first user account, wherein the first cohort group comprises a plurality of user devices authorized to contribute to a digital signing ceremony featuring a multi-party computation (MPC) signing procedure for conducting a plurality of blockchain operations corresponding to a cryptography-based storage application for the first user account, and wherein the first cohort group comprises a first signing policy; transmitting, at the remote coordination server, a first query to the plurality of user devices in the first cohort group; receiving, at the remote coordination server, a communication from one or more of the user devices in the plurality of user devices; determining that the communication indicates that the first signing policy has been met; retrieving a second signing policy; and performing the blockchain operation in response to the second signing policy having been met.
23. The method of any one of the preceding embodiments, wherein determining the second cohort group for the first user account further comprises: determining a user device that transmitted the communication; and in response to determining that the user device transmitted the communication, adding the user device to a second cohort group.
24. The method of any one of the preceding embodiments, wherein the first signing policy uses asynchronous transmissions, and wherein the second signing policy uses synchronous transmissions.
25. The method of any one of the preceding embodiments, further comprising: in response to the first query, receiving, at the remote coordination server from a first user device of the plurality of user devices, a first intermediary communication, wherein the first intermediary communication is one of a first plurality of intermediary communications that comprise the digital signing ceremony, and wherein each of the first plurality of intermediary communications comprises end-to-end encryption to prevent the remote coordination server from accessing a respective message in each of the first plurality of intermediary communications; and in response to receiving the first intermediary communication, transmitting a second query to one or more of the plurality of user devices.
26. The method of any one of the preceding embodiments, further comprising: in response to receiving the communication, initiating a secure broadcast channel between the remote coordination server and a user device in a second cohort group; and transmitting an additional communication, using the secure broadcast channel, to meet the second signing policy between the remote coordination server and the user device.
27. The method of any one of the preceding embodiments, wherein the additional communication comprises end-to-end encryption to prevent the user device from accessing a respective message in the additional communication.
28. The method of any one of the preceding embodiments, wherein performing the blockchain operation further comprises: retrieving, at the remote coordination server, a second partial private key; generating a partial digital signature by contributing to the digital signing ceremony using the second partial private key; and transmitting the partial digital signature to a user device in a second cohort group.
29. The method of any one of the preceding embodiments, wherein determining that the communication indicates that the first signing policy has been met further comprises determining that a minimum number of approvals from the plurality of user devices has been received.
30. The method of any one of the preceding embodiments, wherein determining that the communication indicates that the first signing policy has been met comprises: determining a first time at which the first query was sent; determining a current time; determining a difference between the first time and the current time; and determining whether the difference meets a threshold time difference, wherein the threshold time difference is based on the first signing policy.
31. The method of any one of the preceding embodiments, wherein the second signing policy comprises a synchronous two-of-two signing protocol.
32. A tangible, non-transitory, machine-readable medium storing instructions that, when executed by a data processing apparatus, cause the data processing apparatus to perform operations comprising those of any of the preceding embodiments.
33. A system comprising one or more processors; and memory storing instructions that, when executed by the processors, cause the processors to effectuate operations comprising those of any of the preceding embodiments.

34. A system comprising means for performing any of the preceding embodiments.

What is claimed is:

1. A system for performing blockchain operations across distributed computer networks using cohort management groupings for multi-party computations, the system comprising:
   a cryptography-based, storage application that corresponds to a plurality of private keys;
   a plurality of user devices, wherein each of the plurality of user devices corresponds to one of the plurality of private keys; and
   a remote coordination server comprising an application programming interface (API) configured to:
      in response to receiving a user request to perform a blockchain operation, determine a first cohort group for a user account, wherein the first cohort group comprises user devices authorized to contribute to a digital signing ceremony featuring a multi-party computation (MPC) signing procedure for conducting a plurality of blockchain operations corresponding to the cryptography-based, storage application for the user account;
      transmit a first query to the user devices in the first cohort group;
      in response to transmitting the first query, receive a communication from one or more of the user devices in the first cohort group; and
      perform the blockchain operation in response to (i) determining that the communication indicates that a first signing policy for a first tier of the digital signing ceremony has been met and (ii) determining that a second signing policy for a second tier of the digital signing ceremony has been met, the first tier of the digital signing ceremony involving at least one device of the first tier performing signing with respect to the blockchain operation using at least one private key of the plurality of private keys, the second tier of the digital signing ceremony involving at least one device of the second tier performing signing with respect to the blockchain operation using at least one other private key of the plurality of private keys.

2. A method for performing blockchain operations across distributed computer networks using cohort management groupings for multi-party computations, the method comprising:
   receiving, at a remote coordination server, a first user request to perform a blockchain operation with a first user account;
   in response to receiving the first user request, determining, at the remote coordination server, a first cohort group for the first user account, wherein the first cohort group comprises a plurality of user devices authorized to contribute to a digital signing ceremony featuring a multi-party computation (MPC) signing procedure for conducting a plurality of blockchain operations corresponding to a cryptography-based, storage application for the first user account, and wherein the first cohort group comprises a first signing policy that requires at least one device of the first cohort group to perform signing for the blockchain operation with at least one private key;
   transmitting, at the remote coordination server, a first query to the plurality of user devices in the first cohort group;
   receiving, at the remote coordination server, a communication from one or more user devices in the plurality of user devices;
   determining that the communication indicates that the first signing policy of the first cohort group has been met;
   determining that a second signing policy of a second cohort group has been met; and
   performing the blockchain operation in response to (i) determining that the first signing policy of the first cohort group has been met and (ii) determining that the second signing policy of the second cohort group has been met, the second signing policy requiring at least one device of the second cohort group to perform sign for the blockchain operation with at least one other private key.

3. The method of claim 2, further comprising:
   determining that a user device transmitted the communication; and
   in response to determining that the user device transmitted the communication, adding the user device to the second cohort group subject to the second signing policy.

4. The method of claim 2, wherein the first signing policy uses asynchronous transmissions, and wherein the second signing policy uses synchronous transmissions.

5. The method of claim 2, further comprising:
   in response to the first query, receiving, at the remote coordination server from a first user device of the plurality of user devices, a first intermediary communication, of a first plurality of intermediary communications that comprise a first tier of the digital signing ceremony, and wherein each of the first plurality of intermediary communications comprises end-to-end encryption to prevent the remote coordination server from accessing a respective message in each of the first plurality of intermediary communications; and
   in response to receiving the first intermediary communication, transmitting a second query to one or more user devices of the plurality of user devices in connection with a second tier of the digital signing ceremony.

6. The method of claim 2, further comprising:
   in response to receiving the communication, initiating a secure broadcast channel between the remote coordination server and a user device in the second cohort group; and
   transmitting an additional communication, using the secure broadcast channel, to meet the second signing policy between the remote coordination server and the user device.

7. The method of claim 6, wherein the additional communication comprises end-to-end encryption to prevent the user device from accessing a respective message in the additional communication.

8. The method of claim 2, wherein:
   the at least one private key is at least one partial private key of a plurality of partial private keys corresponding to the cryptography-based, storage application;
   the at least one other private key is at least one other partial private key of the plurality of partial private keys; and
   performing the blockchain operation further comprises:
      retrieving, at an always-on server, a partial private key of the plurality of partial private keys;

generating a partial digital signature by contributing to the digital signing ceremony using the partial private key; and transmitting the partial digital signature to a user device in the second cohort group.

9. The method of claim 2, wherein determining that the communication indicates that the first signing policy has been met further comprises determining that a minimum number of approvals from the plurality of user devices has been received.

10. The method of claim 2, wherein determining that the communication indicates that the first signing policy has been met comprises:
determining a first time at which the first query was sent;
determining a current time;
determining a difference between the first time and the current time; and
determining whether the difference meets a threshold time difference, wherein the threshold time difference is based on the first signing policy.

11. The method of claim 2, wherein the second signing policy comprises a synchronous two-of-two signing protocol.

12. One or more non-transitory, computer-readable media comprising instructions that, when executed on one or more processors, causes operations comprising:
receiving, at a remote coordination server, a first user request to perform a blockchain operation with a first user account;
in response to receiving the first user request, determining, at the remote coordination server, a first cohort group for the first user account, wherein the first cohort group comprises a plurality of user devices authorized to contribute to a digital signing ceremony featuring a multi-party computation (MPC) signing procedure for conducting a plurality of blockchain operations corresponding to a cryptography-based, storage application for the first user account, and wherein the first cohort group comprises a first signing policy that requires at least one device of the first cohort group to perform signing for the blockchain operation with at least one private key;
transmitting, at the remote coordination server, a first query to the plurality of user devices in the first cohort group;
receiving, at the remote coordination server, a communication from one or more user devices in the plurality of user devices;
determining that the communication indicates that the first signing policy has been met;
determining that a second signing policy of a second cohort group has been met; and
performing the blockchain operation in response to (i) determining that the first signing policy of the first cohort group has been met and (ii) determining that the second signing policy of the second cohort group has been met, the second signing policy requiring at least one device of the second cohort group to perform sign for the blockchain operation with at least one other private key.

13. The one or more non-transitory, computer-readable media of claim 12, further comprising:
in response to determining that a user device transmitted the communication, adding the user device to the second cohort group subject to the second signing policy.

14. The one or more non-transitory, computer-readable media of claim 12, wherein the first signing policy uses asynchronous transmissions, and wherein the second signing policy uses synchronous transmissions.

15. The one or more non-transitory, computer-readable media of claim 12, wherein the instructions further cause operations comprising:
in response to the first query, receiving, at the remote coordination server from a first user device of the plurality of user devices, a first intermediary communication of a first plurality of intermediary communications that comprise a first tier of the digital signing ceremony, and wherein each of the first plurality of intermediary communications comprises end-to-end encryption to prevent the remote coordination server from accessing a respective message in each of the first plurality of intermediary communications; and
in response to receiving the first intermediary communication, transmitting a second query to one or more user devices of the plurality of user devices in connection with a second tier of the digital signing ceremony.

16. The one or more non-transitory, computer-readable media of claim 12, wherein the instructions further cause operations comprising:
in response to receiving the communication, initiating a secure broadcast channel between the remote coordination server and a user device in the second cohort group; and
transmitting an additional communication, using the secure broadcast channel, to meet the second signing policy between the remote coordination server and the user device.

17. The one or more non-transitory, computer-readable media of claim 16, wherein the additional communication comprises end-to-end encryption to prevent the user device from accessing a respective message in the additional communication.

18. The one or more non-transitory, computer-readable media of claim 12, wherein:
the at least one private key is at least one partial private key of a plurality of partial private keys corresponding to the cryptography-based, storage application;
the at least one other private key is at least one other partial private key of the plurality of partial private keys; and
performing the blockchain operation further comprises:
retrieving, at an always-on server, a partial private key of the plurality of partial private keys;
generating a partial digital signature by contributing to the digital signing ceremony using the partial private key; and
transmitting the partial digital signature to a user device in the second cohort group.

19. The one or more non-transitory, computer-readable media of claim 12, wherein determining that the communication indicates that the first signing policy has been met further comprises determining that a minimum number of approvals from the plurality of user devices has been received.

20. The one or more non-transitory, computer-readable media of claim 12, wherein determining that the communication indicates that the first signing policy has been met comprises:
determining a first time at which the first query was sent;
determining a current time;
determining a difference between the first time and the current time; and determining whether the difference meets a threshold time difference, wherein the threshold time difference is based on the first signing policy.

* * * * *